US010661237B2

(12) United States Patent
Steele et al.

(10) Patent No.: US 10,661,237 B2
(45) Date of Patent: May 26, 2020

(54) HIGH PERFORMANCE STATIC MIXER

(71) Applicant: MOTT CORPORATION, Farmington, CT (US)

(72) Inventors: James K. Steele, Rockfall, CT (US); Christopher Martino, Farmington, CT (US); Matthew C. Siok, Farmington, CT (US); Alfred Romano, Terryville, CT (US); Kenneth L. Rubow, Avon, CT (US)

(73) Assignee: MOTT CORPORATION, Farmington, CT (US)

( * ) Notice: Subject to any disclaimer, the term of this patent is extended or adjusted under 35 U.S.C. 154(b) by 121 days.

(21) Appl. No.: 15/663,741

(22) Filed: Jul. 29, 2017

(65) Prior Publication Data

US 2018/0056252 A1 Mar. 1, 2018

Related U.S. Application Data

(60) Provisional application No. 62/380,688, filed on Aug. 29, 2016.

(51) Int. Cl.
*B01F 5/06* (2006.01)
*B33Y 80/00* (2015.01)
(Continued)

(52) U.S. Cl.
CPC ............ *B01F 5/0688* (2013.01); *B01D 15/12* (2013.01); *B01D 15/166* (2013.01);
(Continued)

(58) Field of Classification Search
CPC ...... B01D 15/22; G01N 30/60; G01N 30/603; G01N 30/6065; B01J 2219/00423; F01N 3/035
See application file for complete search history.

(56) References Cited

U.S. PATENT DOCUMENTS

| 3,453,811 A * | 7/1969 | Crowley | ................ | G01N 30/32 |
| | | | | 96/107 |
| 4,582,608 A * | 4/1986 | Ritacco | .................. | B01D 15/22 |
| | | | | 210/198.2 |

(Continued)

FOREIGN PATENT DOCUMENTS

GB 2506165 A 3/2014

OTHER PUBLICATIONS

International Search Report and Written Opinion of PCT/US2017/044562, dated Jan. 9, 2018, 18 pages.

*Primary Examiner* — Tony G Soohoo
*Assistant Examiner* — Elizabeth Insler
(74) *Attorney, Agent, or Firm* — Cantor Colburn LLP

(57) ABSTRACT

A static mixer device comprising a housing having a proximal end, a distal end, and an opening extending between the proximal and distal ends. In certain embodiments, a plurality of metal frits is positioned within the opening of the housing, each of the metal frits extending across a cross-sectional dimension of the opening and having interconnected porosity. In other embodiments, one or more mixer elements fabricated using laser additive manufacturing technology and having novel configurations are positioned within the opening of the housing. In yet other embodiments, the housing comprises multiple openings having different diameters from each other, with each opening either extending through the housing with a constant diameter or with one or more of the openings having a varying diameter.

23 Claims, 28 Drawing Sheets

(51) Int. Cl.
*B33Y 10/00* (2015.01)
*B01F 3/08* (2006.01)
*B01D 15/16* (2006.01)
*B01F 13/10* (2006.01)
*G01N 30/60* (2006.01)
*B01D 15/12* (2006.01)
*G01N 30/02* (2006.01)

(52) U.S. Cl.
CPC ............ *B01F 3/0861* (2013.01); *B01F 5/061* (2013.01); *B01F 5/064* (2013.01); *B01F 5/0612* (2013.01); *B01F 5/0615* (2013.01); *B01F 5/0644* (2013.01); *B01F 5/0647* (2013.01); *B01F 5/0648* (2013.01); *B01F 5/0654* (2013.01); *B01F 5/0655* (2013.01); *B01F 5/0691* (2013.01); *B01F 5/0693* (2013.01); *B01F 13/1016* (2013.01); *B01F 13/1022* (2013.01); *B33Y 10/00* (2014.12); *B33Y 80/00* (2014.12); *G01N 30/60* (2013.01); *G01N 30/603* (2013.01); *B01F 2005/0623* (2013.01); *B01F 2005/0636* (2013.01); *B01F 2215/0037* (2013.01); *B01F 2215/0431* (2013.01); *G01N 2030/027* (2013.01)

(56) References Cited

U.S. PATENT DOCUMENTS

| | | | | |
|---|---|---|---|---|
| 6,637,928 | B2 | 10/2003 | Schuchardt | |
| 7,325,970 | B2 | 2/2008 | Keller | |
| 7,588,683 | B2 * | 9/2009 | Willis | .................... G01N 30/56 |
| | | | | 210/198.2 |
| 8,776,621 | B2 * | 7/2014 | Modic | .................... B01L 3/502 |
| | | | | 73/863.23 |
| 8,936,723 | B2 * | 1/2015 | Nickerson | .............. B01D 15/22 |
| | | | | 210/198.2 |
| 9,290,372 | B2 * | 3/2016 | Bellqvist | ............ G01N 30/6017 |
| 2011/0049030 | A1 | 3/2011 | Nickerson | |
| 2015/0219604 | A1 * | 8/2015 | Ritchie | .................. B01D 15/20 |
| | | | | 73/61.53 |
| 2016/0175787 | A1 * | 6/2016 | Merrigan | .............. B01F 5/0619 |
| | | | | 210/757 |

* cited by examiner

HIGH PERFORMANCE STATIC MIXER

CROSS-REFERENCE TO RELATED APPLICATION

This application claims priority to U.S. Provisional Patent Application No. 62/380,688, filed Aug. 29, 2016, and entitled "HIGH PERFORMANCE STATIC MIXER". The contents of the aforementioned application are incorporated herein by reference.

BACKGROUND

Static mixers are used in varied engineering applications for the continuous mixing, dispersing, reaction and/or heating and cooling of fluid materials. These devices are motionless (hence, "static") and are typically used as in-line components that work through the energy of the flow stream in which they are employed. Static mixers may be used to treat liquids, gases and mixtures thereof with varying viscosities, volumetric flow rates and physical properties.

Conventional static mixers may comprise one or more mixing elements located within a tubular housing that is placed within the flow path that contains the fluid(s) to be mixed. For example, static mixers may comprise a unitary mixing element of a suitable shape, such as an elongated helical structure as described in U.S. Pat. No. 7,325,970, which is incorporated herein in its entirety for all purposes. In other examples, static mixers comprise individual mixing elements stacked in series at varying angles, such as the planar mixing elements described in U.S. Pat. No. 6,637,928, which is incorporated herein in its entirety for all purposes.

Static mixers are often used in high performance liquid chromatography ("HPLC") applications. HPLC is a form of column chromatography in which a sample is placed within a solvent and pumped at high pressure through a column housing chromatographic packing material. The sample is carried by a moving carrier fluid stream such that compounds within the sample are separated and can thereafter be identified and quantified. HPLC often makes use of two or more different solvents in which the sample to be analyzed is injected. Because of the desired high precision of HPLC processes, the solvents must be thoroughly and homogenously mixed for maximum instrument performance. For example, incomplete solvent mixing may result in degradation of the HPLC chromatogram, in turn resulting in excessive baseline noise (as manifested by a periodic ripple of the detector signal versus time) and/or poor peak shapes (as manifested by broad and/or asymmetrical peak widths).

SUMMARY OF THE INVENTION

The present invention provides static mixer elements and devices that provide advantages over conventional mixers. Such advantages include ease of manufacturing, reduced mixer size, and improved mixing of varied fluids.

In one aspect, the present invention comprises a static mixer device comprising a housing having a proximal end, a distal end, and an opening extending between the proximal and distal ends. In certain embodiments, a plurality of metal frits is positioned within the opening of the housing, each of the metal frits extending across a cross-sectional dimension of the opening and having interconnected porosity. In other embodiments, one or more mixer elements fabricated using laser additive manufacturing technology and having novel configurations are positioned within the opening of the housing. In yet other embodiments, the housing comprises multiple openings having different diameters from each other, with each opening either extending through the housing with a constant diameter or with one or more of the openings having a varying diameter.

DETAILED DESCRIPTION OF THE PREFERRED EMBODIMENTS

Figure 1:
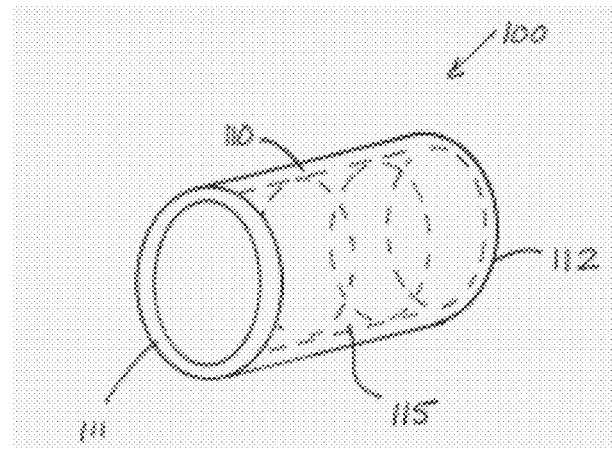
FIG. 1 illustrates an exemplary embodiment of a static mixer, according to some embodiments of the present disclosure.

In one aspect, the present invention comprises various embodiments of a static mixer 100 that comprises a housing 110 with a proximal end 111, a distal end 112 and an opening 115 extending between the proximal and distal ends, as shown in FIG. 1. A plurality of metal frits 120 are positioned within the opening 115, as shown in the cross-sectional view of static mixer 100 in FIG. 2.

Figure 2:
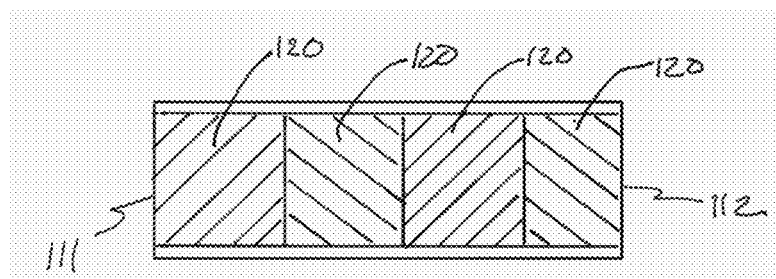
FIG. 2 illustrates a cross-sectional view of an exemplary embodiment of a static mixer, according to some embodiments of the present disclosure.

The housings 110 used in the present invention are of any suitable size and shape. Although such housings are typically cylindrical and the openings therein are typically circular in cross-section (and are illustrated as such herein), they may be of any other suitable shape. Alternatively, the exterior of the housing 110 and the opening 115 may be of different cross-sectional shapes. In certain embodiments, the opening 115 is characterized by a substantially constant dimension along its full length, as illustrated in FIG. 2. In certain embodiments, the opening 115 is circular in cross-section and has a substantially constant diameter of up to about 0.06". In certain embodiments, the opening 115 has a length of up to about 0.025". In other embodiments, the opening 115 is characterized by more than one cross-sectional dimension and/or shapes along its length, as shown for exemplary embodiments herein. In certain embodiments, the opening 115 is circular in cross-section and has a diameter of up to about 0.06" in a first length, and a different diameter of up to about 0.03" in a second length. Although the embodiments described above make use of openings having a diameter of up to about 0.06", it should be recognized that housings with openings of any suitable size may be employed. In certain embodiments, the cross-section of the opening is characterized by a first dimension at each of said proximal and distal ends, and a second dimension at a location between the proximal and distal ends, wherein the second dimension is less than said first dimension.

The porous metal frits 120 of the present invention are characterized by an interconnected porosity. Generally, the pores within the metal frits of the present invention are preferably sized on the scale of micrometers, tens of micrometers, or hundreds of micrometers. In preferred embodiments, the metal frits used in the present invention are characterized by nominal pore sizes that range from 0.2 to 100 micrometers, and more preferably 2 to 10 micrometers. In some embodiments, the static mixers of the present invention comprise multiple metal frits in which each frit is characterized by a substantially similar nominal pore size. In other embodiments, the static mixers of the present invention comprise multiple metal frits in which at least some of the frits are characterized by different nominal pore sizes. The metal frits are manufactured using suitable sintering techniques of metallic particles of suitable size and composition.

Figure 3:
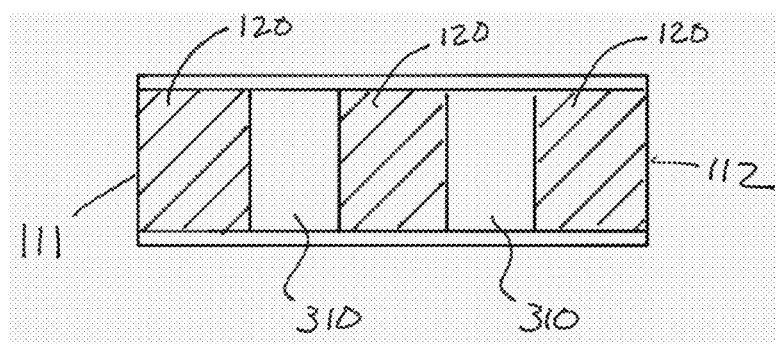
FIG. 3 illustrates a cross-sectional view of an exemplary embodiment of a static mixer, according to some embodiments of the present disclosure.

In certain embodiments, the static mixers of the present invention make use of two, three, four or more metal frits 120. The metal frits are optionally in direct contact with each adjacent frit, as illustrated in FIG. 2. Alternatively, at least some of the metal frits may be spaced apart from any adjacent frit, such that a gap 310 is formed between frits as shown in FIG. 3. In some embodiments, such gaps have a length of up to about 0.03". In certain embodiments, loose particulate is placed within one or more gaps formed between adjacent metal frits. Examples of suitable loose particulate material is in the form of metal particles having an average dimension of up to approximately 100 micrometers.

Examples of embodiments of the present invention that make use of metal frits are described below. Generally, Examples 1-13 static mixer designs were based on utilizing a center cylindrical housing (0.25" OD, 0.062" ID×0.25" long) into which porous metal frits of various media grades were placed in various combinations. These cylindrical housings were then welded to standard HPLC compression fittings to be able to test mixing performance using an Agilent 1100 series HPLC system.

Example 1

Figure 4:
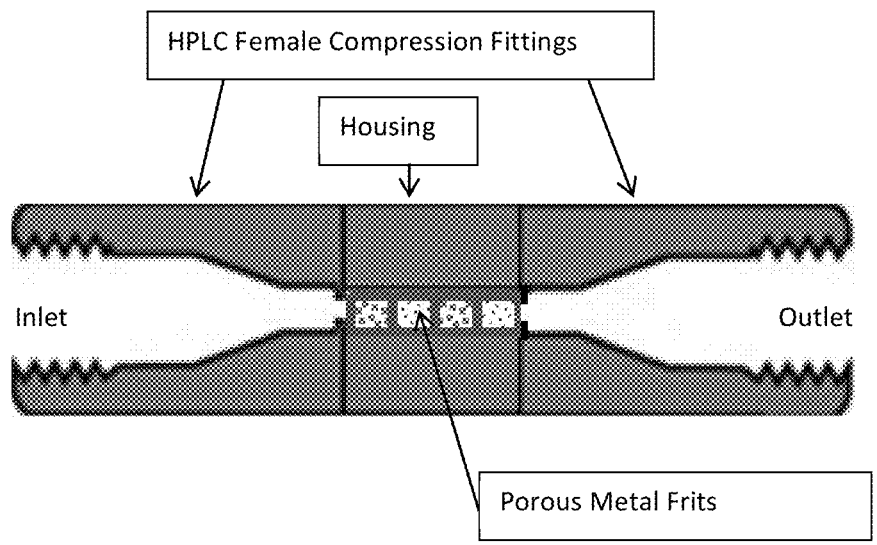
FIG. 4 illustrates an exemplary embodiment of a static mixer assembly, according to some embodiments of the present disclosure

In this example, four 316L stainless steel media grade 2 (i.e., having a nominal mean pore size of 2 micrometers) porous metal frits were inserted into a housing in the form of a central sleeve. The frits were then sinter bonded to the stainless steel sleeve, and HPLC compression fitting hardware was welded to the sleeve to make the static mixer assembly as shown in FIG. 4. For this example, the central housing is 316L stainless steel cylinder with and OD of 0.25", and ID of 0.062", and 0.025" long. The porous frits pressed into the housing were standard Mott media grade 2 frits with dimension of 0.062" diameter by 0.062" thick. The HPLC hardware welded to the housing were standard female (internal) stainless steel Zero Dead Volume 10-32 thread compression fittings for use with 1/16" OD tubing.

Example 2

In this example, the same external configuration was used as described in Example 1 with the only change being the media grade of the porous media inserted into the central housing. For this example, the porous metal frits from left to right were Mott Media Grade 2, Media Grade 10 (i.e., having a nominal mean pore size of 10 micrometers), Media Grade 2, and Media grade 10 all being of 316L stainless steel composition.

Example 3

In this example, the same external configuration was used as described in Example 1 with the only change being the media grade of the porous media inserted into the central housing. For this example, the porous metal frits from left to right were Mott Media Grade 2, Media Grade 2, Media Grade 10, and Media grade 10 all being of 316L stainless steel composition.

Example 4

In this example, the same external configuration was used as described in Example 1 with the only change being the media grade of the porous media inserted into the central housing. For this example, all four of the inserted porous metal frits were Mott Media Grade 10, of 316L stainless steel composition.

Example 5

Figure 5:
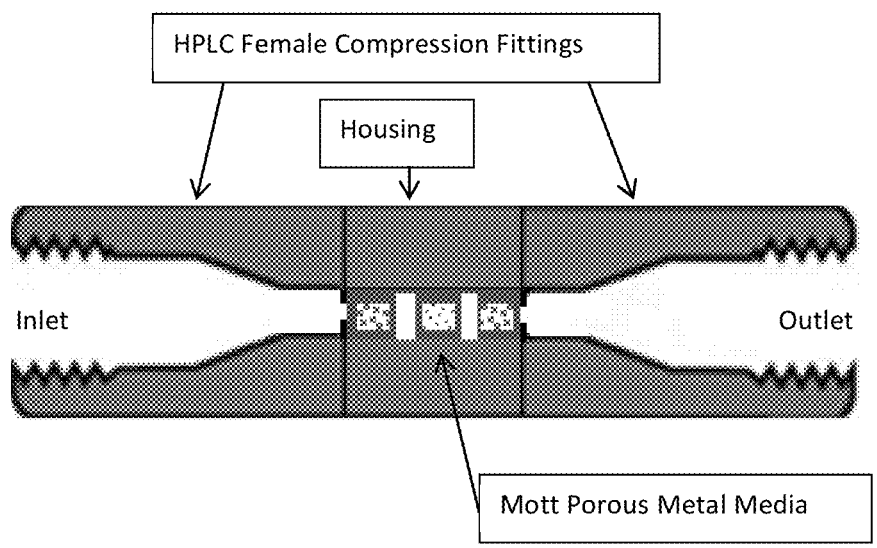
FIG. 5 illustrates an exemplary embodiment of a static mixer assembly, according to some embodiments of the present disclosure.

In this example, three 316L stainless steel media grade 2 porous metal frits were inserted and sinter bonded into a stainless steel central sleeve housing. HPLC compression fitting hardware was thereafter welded to the sleeve to make the static mixer assembly as shown in FIG. 5. In contrast to Example 1, one frit was centered into the central sleeve and two other frits were placed flush with the ends of the cylindrical housing. This configuration resulted in a small open gab between the frits to enhance macro mixing. For this example, the central housing is 316L stainless steel cylinder with and OD of 0.25", and ID of 0.062", and 0.025" long. The porous frits pressed into the housing were standard Mott media grade 2 frits with dimension of 0.062" diameter by 0.062" thick and the gaps between the porous frits were 1/32" wide. The HPLC hardware welded to the housing were standard female (internal) stainless steel Zero Dead Volume 10-32 thread compression fittings for use with 1/16" OD tubing.

Example 6

In this example, the same external configuration was used as described in Example 5 with the only change being the media grade of the porous media inserted into the central housing. For this example, the porous metal frits from left to right were Mott Media Grade 2, Media Grade 10, and Media Grade 2 all being of 316L stainless steel composition.

Example 7

In this example, the same external configuration was used as described in Example 5 with the only change being the media grade of the porous media inserted into the central housing. For this example, the porous metal frits from left to right were Mott Media Grade 10, Media Grade 2, and Media Grade 10 all being of 316L stainless steel composition.

Example 8

In this example, the same external configuration was used as described in Example 5 with the only change being the media grade of the porous media inserted into the central housing. For this example, all three of the inserted porous metal frits were Mott Media Grade 10, of 316L stainless steel composition.

Example 9

Figure 6:
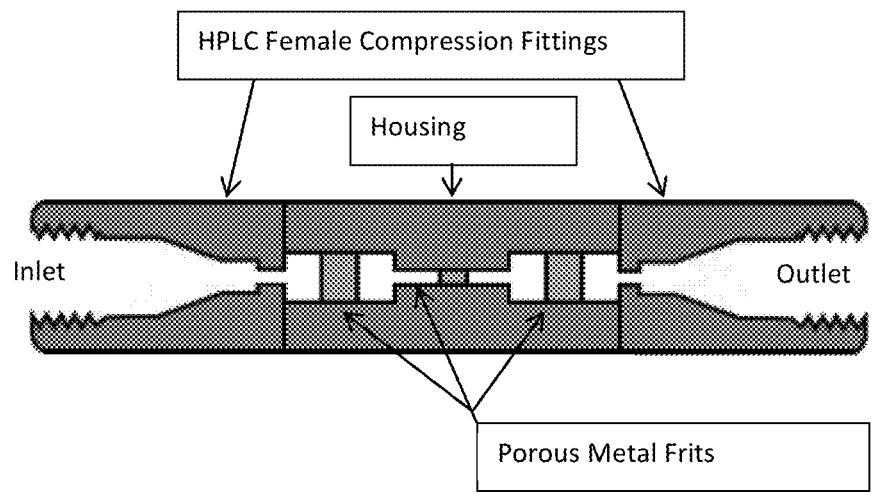
FIG. 6 illustrates an exemplary embodiment of a static mixer assembly, according to some embodiments of the present disclosure.

This example is a variation of Example 5 in which three 316L stainless steel media grade 2 porous metal frits were placed into a central sleeve housing containing two different diameters through its length as shown in FIG. 6. The frits were sinter bonded to the stainless steel sleeve, and HPLC compression fitting hardware was welded to the sleeve to make the static mixer assembly. In this example, one smaller diameter frit is centered into the smaller diameter central housing section and the other two frits are placed in the larger diameter sections of the ends of housing cylinder. Mixing is enhanced by the gaps between the frits and the reduced diameter central region. For this example, the central housing is 316L stainless steel cylinder with and OD of 0.25", and ID's of 0.062" for the outer sections and 0.031" for the inner section. The porous frits pressed into the housing were standard Mott media grade 2 frits with dimension of 0.062" diameter by 0.062" thick for the outer sections and 0.031" diameter×0.031" thick for the center section. The HPLC hardware welded to the housing were standard female (internal) stainless steel Zero Dead Volume 10-32 thread compression fittings for use with $\frac{1}{16}$" OD tubing.

Example 10

In this example, the same external configuration was used as described in Example 9 with the only change being the media grade of the porous media inserted into the central housing. For this example, the porous metal frits from left to right were Mott Media Grade 2, Media Grade 10, and Media Grade 2 all being of 316L stainless steel composition.

Example 11

In this example, the same external configuration was used as described in Example 9 with the only change being the media grade of the porous media inserted into the central housing. For this example, the porous metal frits from left to right were Mott Media Grade 10, Media Grade 2, and Media Grade 10 all being of 316L stainless steel composition.

Example 12

In this example, the same external configuration was used as described in Example 9 with the only change being the media grade of the porous media inserted into the central housing. For this example, all 3 of the inserted porous metal frits were Mott Media Grade 10, of 316L stainless steel composition.

Example 13

Figure 7:
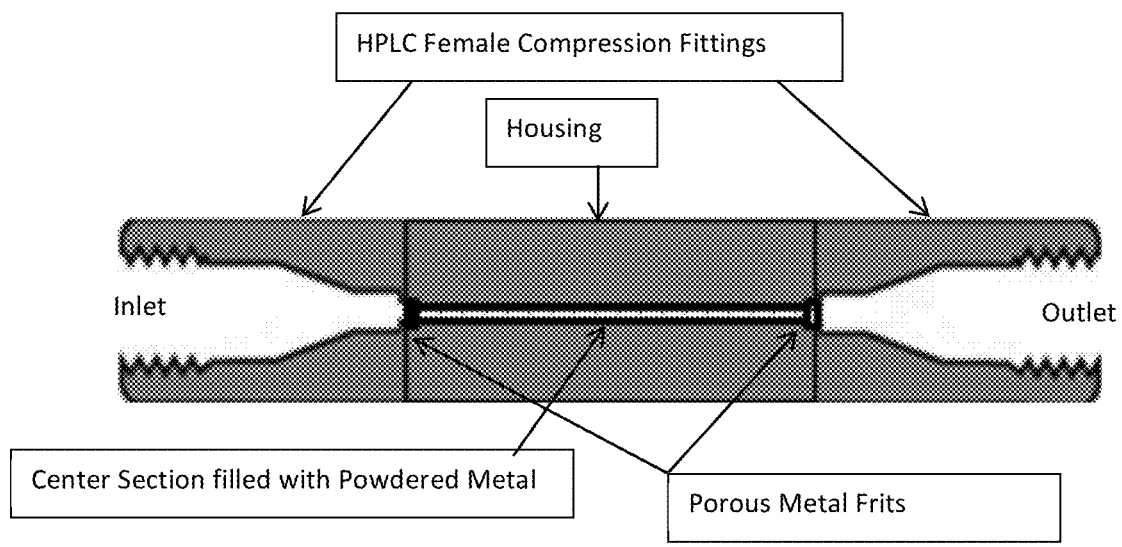
FIG. 7 illustrates an exemplary embodiment of a static mixer assembly, according to some embodiments of the present disclosure.

This example is similar to Example 9 in that a center section of the opening within the central sleeve housing has a reduced diameter relative to its end portions. In this example, however, loose metal particulate was placed within the central region of the opening in the housing, and two porous metal frits were inserted into the ends of a central sleeve housing, as shown in FIG. 7. In this example, the frits are made from 316L stainless steel and are media grade 2. The central housing was a 316L stainless steel cylinder with an OD of 0.25", an ID of 0.031" and a length of 0.75". Cavities of 0.062" diameter and 0.062" deep were machined at each end of the central housing to expand the diameter of the opening within the housing at its ends, and to create areas in which to insert the porous metal frits. The porous frits pressed into the housing were standard Mott media grade 2 frits with dimension of 0.062" diameter by 0.062" thick. The metal powder placed into the center section was irregularly shaped 316L stainless steel with average dimensions of roughly 100 micrometers. In other embodiments, spherical metal powder can be used. The HPLC hardware welded to the housing were standard female (internal) stainless steel Zero Dead Volume 10-32 thread compression fittings for use with $\frac{1}{16}$" OD tubing.

In another aspect of the present invention, static mixer elements are fabricated using laser additive manufacturing technology ("LAMT"). As used herein, additive manufacturing refers to a 3D printing process whereby successive layers of material are formed to create an object of a desired shape. Laser additive manufacturing or LAMT refers to additive manufacturing techniques that employ a laser to melt, soften, sinter or otherwise affect the material used in the object being manufactured. By varying material and manufacturing process specifications and conditions, a desired and tailored pore size, morphology and distribution can be produced. The resultant porous structure may be used as is, or it may be joined or otherwise fabricated with a solid full density component to complete a finished product.

The type of laser additive manufacturing used in the present invention is any applicable technique, such as selective laser melting, selective laser sintering, and direct metal laser sintering. As is known in the art, selective laser melting results in the complete or near-complete melting of particles using a high-energy laser; whereas selective laser sintering and direct metal laser sintering results in the sintering of particulate material, binding the material together to form a structure. Generally, in accordance with embodiments of the present invention, laser additive manufacturing techniques that result in the sintering of particles are preferred over those that result in the melting of particles because melting techniques can result in a less porous structure than those preferred for use in the present invention. The lasers used in the present invention include any suitable lasers, such as carbon dioxide pulsed. As known in the art, the laser scans across the surface of a first layer of a particle bed placed onto a build plate (i.e., an underlying support structure of any suitable size, shape and composition) to melt or sinter the particles, followed by the application of another layer of particles for subsequent laser scanning and melting or sintering. Multiple subsequent layers are created as the laser scans across the bed and layers of particulate are applied as necessary to create a product with a desired size and shape, often in accordance with CAD data corresponding to a 3D description of the product. The product is optionally separated from the build plate to form a final product suitable for use, unless the build plate is intended to be an integral component of the final product. As used herein, "sinter" refers to any process in which particles are joined together by heat without the complete melting of the particles.

Along with processing parameters such as laser power and raster speed, and particle size, shape, roughness and composition, the inventors have found that the build angle (i.e., the angle at which the LAMT product is formed relative to the horizontal plane of the build plate) is meaningful for the production of the products of the present invention. Specifically, the inventors have found that building layers of particulate material using LAMT techniques to form structures at no less than 30° relative to the build plate is sufficient to prevent deterioration within the LAMT structure. Exemplary embodiments of the present invention form LAMT structures at 30°, 45°, and 60° relative to the build plate. Forming the LAMT product at a build angle, in contrast to forming the LAMT product at no build angle such that it is in contact with the build plate at all locations along its cross-section, has the advantageous result of reducing the portion of the LAMT manufactured product that remains in contact with (and possibly bonded to) the build plate after completion of the LAMT process. LAMT products that are printed at a build angle may therefore be easier to separate from underlying build plates, in the event that such separation is desired. Build angles less than 30°, however, generally may not result in enough of a basis for subsequent layer deposition. With insufficient support from base layer(s) that may result from build angles less than 30°, the resulting porous components may lose product integrity across multiple build layers.

The materials used in the present invention are any materials provided in particulate form that can be sintered, partially melted, or entirely melted by a laser used in laser additive manufacturing techniques. As used herein, "particulate," "particles," and "powder" are used synonymously to mean particles that are sized on the order of millimeters, micrometers or nanometers, and have any suitable shape such as spherical, substantially spherical (e.g., having an aspect ratio greater than 0.6, 0.7 or 0.8) and irregular, and mixtures thereof. A preferred particle size range for use in the present invention is less than 10 to 500 micrometers. The particle surface edge(s) may be smooth, sharp, or a mixture thereof. Preferred materials for use in the present invention include materials such as, for example, nickel, cobalt, iron, copper, aluminum, palladium, titanium, tungsten, platinum, silver, gold, and alloys and oxides thereof including stainless steels and nickel-based steels such as Hastelloy® (Haynes Stellite Company, Kokomo, Ind.). Various polymer materials may also be used.

The LAMT techniques as described herein can be used to manufacture static mixer elements with complex shapes that are highly effective yet small in shape. Generally, and without wishing to be bound by theory, the small and unique complex shapes of the present invention that may be manufactured using LAMT yield complex fluid flow patterns that, when compared with conventional mixers, result in more thorough mixing over smaller internal volumes. The result is a smaller sized mixer that can be used for the thorough mixing of multiple fluids. As such, the static mixers of the present invention are particularly well-suited for applications such as HPLC.

Examples of embodiments of the present invention that make use of static mixer elements fabricated using LAMT techniques are described below with reference to Examples 14-74.

Examples 14-31 were based on utilizing LAMT to create flow paths that induce turbulence and/or folding of the fluid to promote mixing at low flow rates as typically seen in HPLC/UPLC applications. These designs utilize impeller designs that induce clockwise and anti-clockwise rotation of the fluid to promote mixing. The cavities surrounding the internal impellers were either left open (i.e., void of porous material) or filled with porous media to promote micromixing. Cylindrical cavities were created at the inlet and outlet ends of each device for optional installation of Mott porous metal frits to be used for filtration and/or micro mixing.

Example 14

Figure 8:
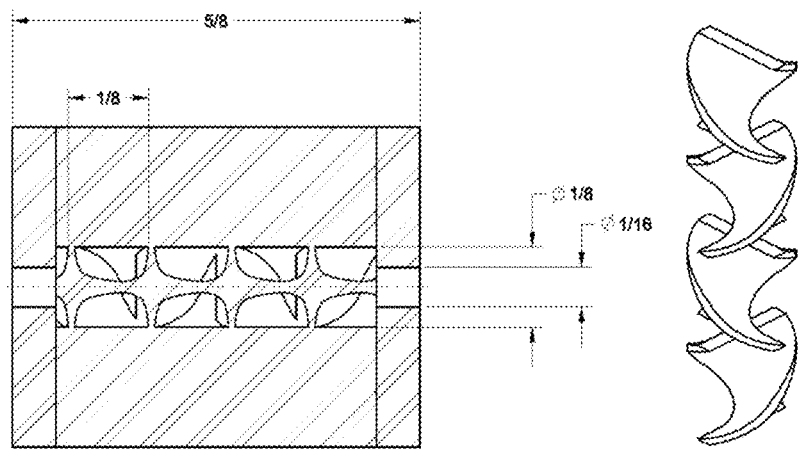
FIG. 8 illustrates an exemplary embodiment of a static mixer, according to some embodiments of the present disclosure.
Figure 9:
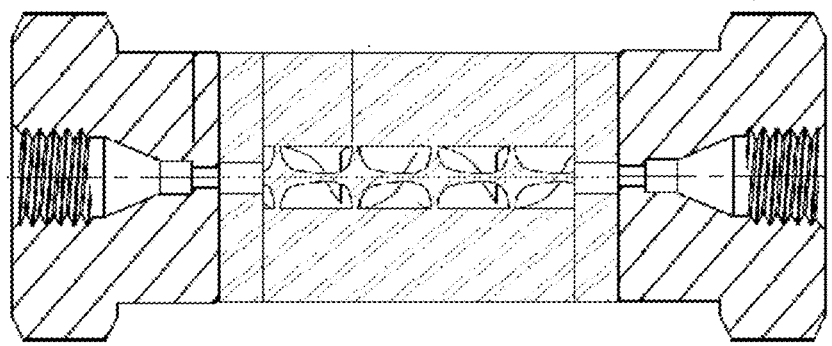
FIG. 9 illustrates an exemplary embodiment of a static mixer assembly, according to some embodiments of the present disclosure.

This example makes use of an internal fixed impeller design with four segments, as shown in FIGS. 8 and 9. The first segment induces clockwise rotation, the second reverses direction to anti-clockwise, the third segment rotates clockwise, and the 4th segment rotates anti-clockwise. For this example, the impeller diameter was ⅛" and each flow reversal segment was ⅛" in length. The impeller was constructed into the center of a ½" OD solid cylinder and the ends caped with an orifice 0.062" diameter by 0.062" deep. Porous metal media of Mott Media Grade 2 was pressed into the end cavities. Welded to both ends of these mixing housings are standard HPLC interface fittings that can be customized to nearly any dimension and configuration. The completed central mixing housing has a total of four flow reversals. The HPLC hardware welded to the housing for this example were standard female (internal) stainless steel Zero Dead Volume 10-32 thread compression fittings with external ¾" external hexagonal wrench surface for use with 1/16" OD tubing. The internal volume of this assembly is roughly 75 microliters with a total of 4 flow reversals for the assembly.

Example 15

This example makes use of the same external configuration as described in Example 14 with the only change being the central region of the mixing housing. The number of flow reversals was doubled (in comparison to Example 14), keeping all other dimensions constant except for the overall length of the assembly. The internal volume is roughly 150 microliters with a total of 8 flow reversals for the assembly.

Example 16

This example makes use of the same external configuration as described in Example 14 with the only change being the central region of the mixing housing. Here we triple the number of flow reversals keeping all other dimensions constant except for the overall length of the assembly. The internal volume is roughly 225 microliters with a total of 12 flow reversals for the assembly.

Example 17

For this example, we use the same configuration as Example 14 with the only change being to the internal cavities for the flow path. Here the internal cavities are completely filled with porous metal media with a mean pore size of around 2 micrometers to promote micro mixing. The internal volume is roughly 25 microliters with a total of 4 flow reversals for the assembly.

Example 18

For this example, we use the same configuration as Example 14 with the only change being to the internal cavities for the flow path. Here the internal cavities are completely filled with porous metal media with a mean pore size of around 10 micrometers to promote micro mixing. The internal volume is roughly 30 microliters with a total of 4 flow reversals for the assembly.

Example 19

For this example, we use the same configuration as Example 15 with the only change being to the internal cavities for the flow path. Here the internal cavities are completely filled with porous metal media with a mean pore size of around 2 micrometers to promote micro mixing. The internal volume is roughly 50 microliters with a total of 8 flow reversals for the assembly.

Example 20

For this example, we use the same configuration as Example 15 with the only change being to the internal cavities for the flow path. Here the internal cavities are completely filled with porous metal media with a mean pore size of around 10 micrometers to promote micro mixing. The internal volume is roughly 30 microliters with a total of 8 flow reversals for the assembly.

Example 21

For this example, we use the same configuration as Example 16 with the only change being to the internal cavities for the flow path. Here the internal cavities are completely filled with porous metal media with a mean pore size of around 2 micrometers to promote micro mixing. The internal volume is roughly 75 microliters with a total of 12 flow reversals for the assembly.

Example 22

For this example, we use the same configuration as Example 16 with the only change being to the internal cavities for the flow path. Here the internal cavities are completely filled with porous metal media with a mean pore size of around 10 micrometers to promote micro mixing. The internal volume is roughly 90 microliters with a total of 12 flow reversals for the assembly.

Example 23

For this example, we use the same external configuration as described in Example 14 with the only change being the pitch of the internal mixing impellers. Here, each flow reversal occurs every $1/16"$ doubling the number of flow reversals in the same sized package. The internal volume is roughly 40 microliters with a total of 8 flow reversals for the assembly.

Example 24

For this example, we use the same external configuration as described in Example 15 with the only change being the pitch of the internal mixing impellers. Here, each flow reversal occurs every $1/16"$ doubling the number of flow reversals in the same sized package. The internal volume is roughly 80 microliters with a total of 16 flow reversals for the assembly.

Example 25

For this example, we use the same external configuration as described in Example 16 with the only change being the pitch of the internal mixing impellers. Here, each flow reversal occurs every $1/16"$ doubling the number of flow reversals in the same sized package. The internal volume is roughly 160 microliters with a total of 24 flow reversals for the assembly.

Example 26

For this example, we use the same external configuration as described in Example 14 with the only change being the diameter of the internal mixing impellers reduced to $1/16"$. The internal volume is roughly 20 microliters with a total of 4 flow reversals for the assembly.

Example 27

For this example, we use the same external configuration as described in Example 15 with the only change being the diameter of the internal mixing impellers reduced to $1/16"$. The internal volume is roughly 40 microliters with a total of 8 flow reversals for the assembly.

Example 28

For this example, we use the same external configuration as described in Example 16 with the only change being the diameter of the internal mixing impellers reduced to $1/16"$. The internal volume is roughly 60 microliters with a total of 12 flow reversals for the assembly.

Example 29

For this example, we use the same external configuration as described in Example 14 with changes to the diameter of the internal impeller and number of flow reversals. The diameters of the internal mixing impellers were reduced to $1/16"$ and the flow reversal occurring every $1/16"$. The internal volume is roughly 15 microliters with a total of 8 flow reversals for the assembly.

Example 30

For this example, we use the same external configuration as described in Example 15 with changes to the diameter of the internal impeller and number of flow reversals. The diameters of the internal mixing impellers were reduced to $1/16"$ and the flow reversal occurring every $1/16"$. The internal volume is roughly 30 microliters with a total of 16 flow reversals for the assembly.

Example 31

For this example, we use the same external configuration as described in example 15 with changes to the diameter of the internal impeller and number of flow reversals. The diameters of the internal mixing impellers were reduced to 1/16" and the flow reversal occurring every 1/16". The internal volume is roughly 45 microliters with a total of 24 flow reversals for the assembly.

Examples 32-76 were specifically to address the mixing valve on most HPLC systems, which produce alternating slugs of fluid traveling down the tubing by varying the volume of each slug to achieve the desired mixing ratio of the solvents. Examples 32-76 create fluid flow paths of different lengths and then recombine these flow paths multiple times to thoroughly mix these slugs of fluid producing a homogenized mix of solvents. As shown in previous examples, cylindrical cavities were created at the inlet and outlet ends of each device for optional installation of porous metal frits to be used for filtration and/or micro mixing.

Examples 32-46 utilize what the applicants refer to as diamond designs, which create flow paths that follow a variety of directions and lengths starting from one location and recombining at a downstream location of the mixing device. In these designs, the flow path is split into four separate flow paths, each being about 0.010" to 0.060" in diameter, preferably 0.030" in diameter, and then combining back to the periphery of a disc-shaped volume near the exit end of the device. Each of the initial four flow paths make one sharp bend and each has a slightly different overall length, thus assisting in creating phase shifts in the mixing process. Within each of these initial four flow paths are two flow branches of similar diameters that also contain sharp bends and different flow lengths that connect to an adjacent flow paths of the mixing device. The fluid leaves the mixing device through the center of the disc also through a 0.030" diameter flow channel. In the following examples, one, two, or three of these devices were placed in series into assemblies, with and without porous media for testing purposes. All materials used for the diamond mixer design were 316L Stainless steel and it should be noted that any alloys suitable for HPLC applications can be used such as Hastelloy and Titanium alloys may be used.

Example 32

Figure 10A:
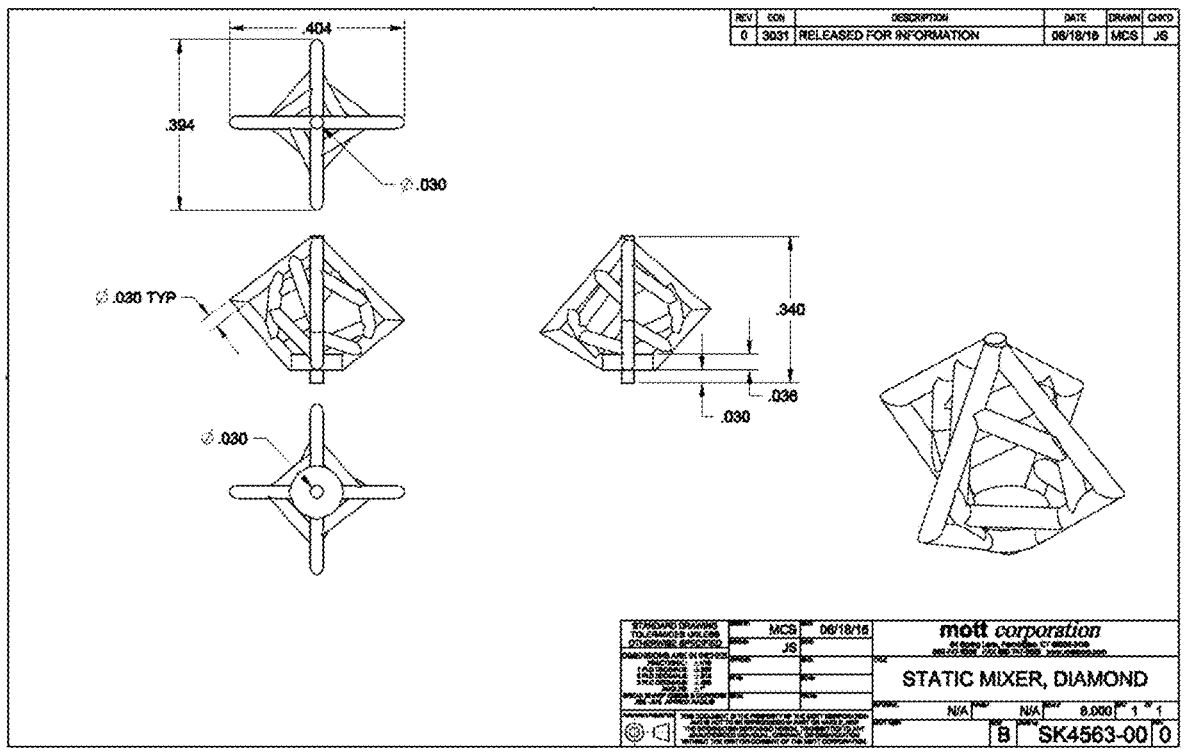
FIG. 10a illustrates an exemplary embodiment of a mixer element, according to some embodiments of the present disclosure.
Figure 10B:
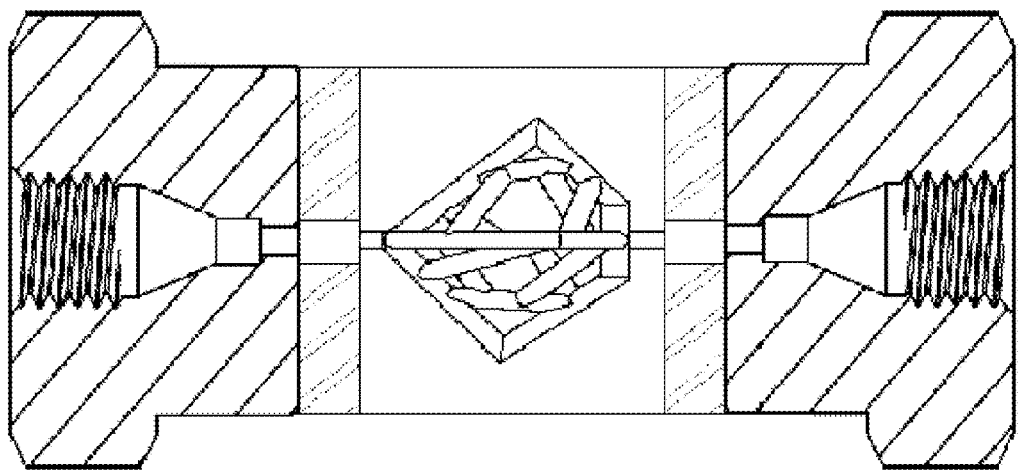
FIG. 10b illustrates an exemplary embodiment of a static mixer assembly, according to some embodiments of the present disclosure.

In this example as shown in FIG. 10, we have a center mixing housing that contains one diamond pattern mixer with 0.062" diameter by 0.062" long chambers on both sides that were intentionally left open. FIG. 10*a* shows detail of the mixing element, and FIG. 10*b* shows the use of this mixing element as part of an example static mixer assembly. Attached to the inlet and outlet sides of the mixing chamber we have HPLC interface adapters. The HPLC hardware attached to the housing for this example were standard female (internal) stainless steel Zero Dead Volume 10-32 thread compression fittings with external 3/4" external hexagonal wrench surface for use with 1/16" OD tubing. The internal volume of this assembly is roughly 30 microliters.

Example 33

For this example, we have the same diamond type mixing device and hardware as in Example 32 with the exception of the cavities on either side of the diamond flow pattern. Here we have pressed standard Mott media grade 2 stainless steel frits for filtration and enhanced micro mixing. The internal volume of this assembly is roughly 25 microliters.

Example 34

For this example, we have the same diamond type mixing device and hardware as in Example 32 with the exception of the cavities on either side of the diamond flow pattern. Here we have pressed standard Mott media grade 10 stainless steel frits for filtration and enhanced micro mixing. The internal volume of this assembly is roughly 25 microliters.

Example 35

For this example, we have the same diamond type mixing device and hardware as in Example 33 with the exception of the diamond flow pattern. Here we have filled the flow channels with stainless steel with an average pore size of 2 micrometers for enhanced micro mixing. The internal volume of this assembly is roughly 20 microliters.

Example 36

For this example, we have the same diamond type mixing device and hardware as in Example 33 with the exception of the diamond flow pattern. Here we have filled the flow channels with porous stainless steel with an average pore size of 10 micrometers for enhanced micro mixing. The internal volume of this assembly is roughly 20 microliters.

Example 37

Figure 11:
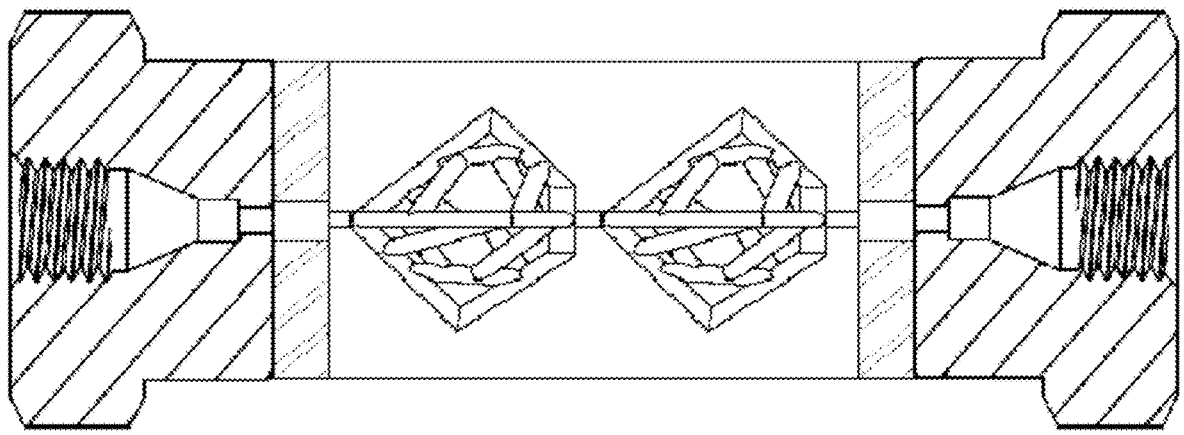
FIG. 11 illustrates an exemplary embodiment of a static mixer assembly, according to some embodiments of the present disclosure.

In this example, we have a center mixing housing that contains two diamond pattern mixers, as shown in FIG. 11, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external 3/4" external hexagonal wrench surface for use with 1/16" OD tubing. The internal volume of this assembly is roughly 60 microliters.

Example 38

For this example, we have the same diamond type mixing device and hardware as in Example 37 with the exception of the cavities on either side of the diamond flow pattern mixers. Here we have pressed standard Mott media grade 2 stainless steel frits for filtration and enhanced micro mixing. The internal volume of this assembly is roughly 55 microliters.

Example 39

For this example, we have the same diamond type mixing device and hardware as in Example 37 with the exception of the cavities on either side of the diamond flow pattern mixers. Here we have pressed standard Mott media grade 10 stainless steel frits for filtration and enhanced micro mixing. The internal volume of this assembly is roughly 55 microliters.

Example 40

For this example, we have the same diamond type mixing device and hardware as in Example 38 with the exception of the diamond flow pattern. Here we have filled the flow channel with porous stainless steel with an average pore size of 2 micrometers for enhanced micro mixing. The internal volume of this assembly is roughly 45 microliters.

Example 41

For this example, we have the same diamond type mixing device and hardware as in Example 38 with the exception of the diamond flow pattern. Here we have filled the flow channels with porous stainless steel with an average pore size of 10 micrometers for enhanced micro mixing. The internal volume of this assembly is roughly 45 microliters.

Example 42

Figure 12:
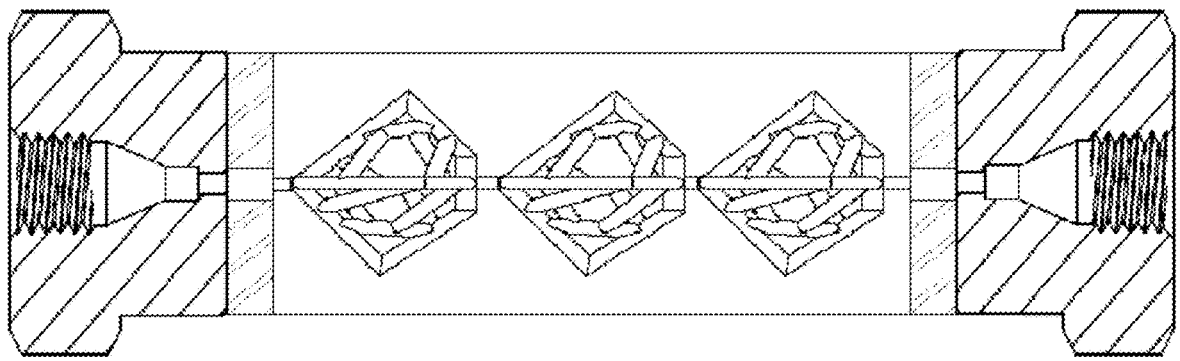
FIG. 12 illustrates an exemplary embodiment of a static mixer assembly, according to some embodiments of the present disclosure.

In this example, we have a center mixing housing that contains three diamond pattern mixers, as shown in FIG. 12, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹/₁₆" OD tubing. The internal volume of this assembly is roughly 90 microliters.

Example 43

For this example, we have the same diamond type mixing device and hardware as in Example 42 with the exception of the cavities on either side of the diamond flow pattern mixers. Here we have pressed standard Mott media grade 2 stainless steel frits for filtration and enhanced micro mixing. The internal volume of this assembly is roughly 85 microliters.

Example 44

For this example, we have the same diamond type mixing device and hardware as in Example 42 with the exception of the cavities on either side of the diamond flow pattern mixers. Here we have pressed standard Mott media grade 10 stainless steel frits for filtration and enhanced micro mixing. The internal volume of this assembly is roughly 85 microliters.

Example 45

For this example, we have the same diamond type mixing device and hardware as in Example 43 with the exception of the diamond flow pattern. Here we have filled the flow channel with porous stainless steel with an average pore size of 2 micrometers for enhanced micro mixing. The internal volume of this assembly is roughly 75 microliters.

Example 46

For this example, we have the same diamond type mixing device and hardware as in Example 43 with the exception of the diamond flow pattern. Here we have filled the flow channels with porous stainless steel with an average pore size of 10 micrometers for enhanced micro mixing. The internal volume of this assembly is roughly 75 microliters.

Examples 47-61 use what the applicants refer to as a helical coil design for the mixing process. For this design, there are two coils: an outer coil with a clockwise rotation and an inner coil with an anti-clockwise rotation. The pitch on the inner and outer coils can be the same, different, or variable along the length of the mixer. The two coils overlap by a predetermined amount such as 10-90%, more preferably 10-75%, and more preferably 40-75% so that fluid transfer between the inner and outer coils occur inducing mixing. Because of the clockwise and anti-clockwise rotation of the coils, when the fluid makes contact from one coil to the other, motion between these fluids is nearly head-on, which increases the efficiency of the mixing process. Both the inner and outer coils are about 0.025" diameter and begin and terminate on opposing sides of small volume manifolds at each end of the mixing device. In the following examples, one, two, or three of these devices were placed in series into assemblies with and without porous media for testing purposes. All materials used for the helical coil design were 316L Stainless steel and it should be noted that any alloys suitable for HPLC applications can be used such as Hastelloy and Titanium alloys may be used. Although not described in the following examples, any such examples may optionally include an obstruction at the intersection of the inner and outer coils to induce further mixing.

Example 47

Figure 13A:
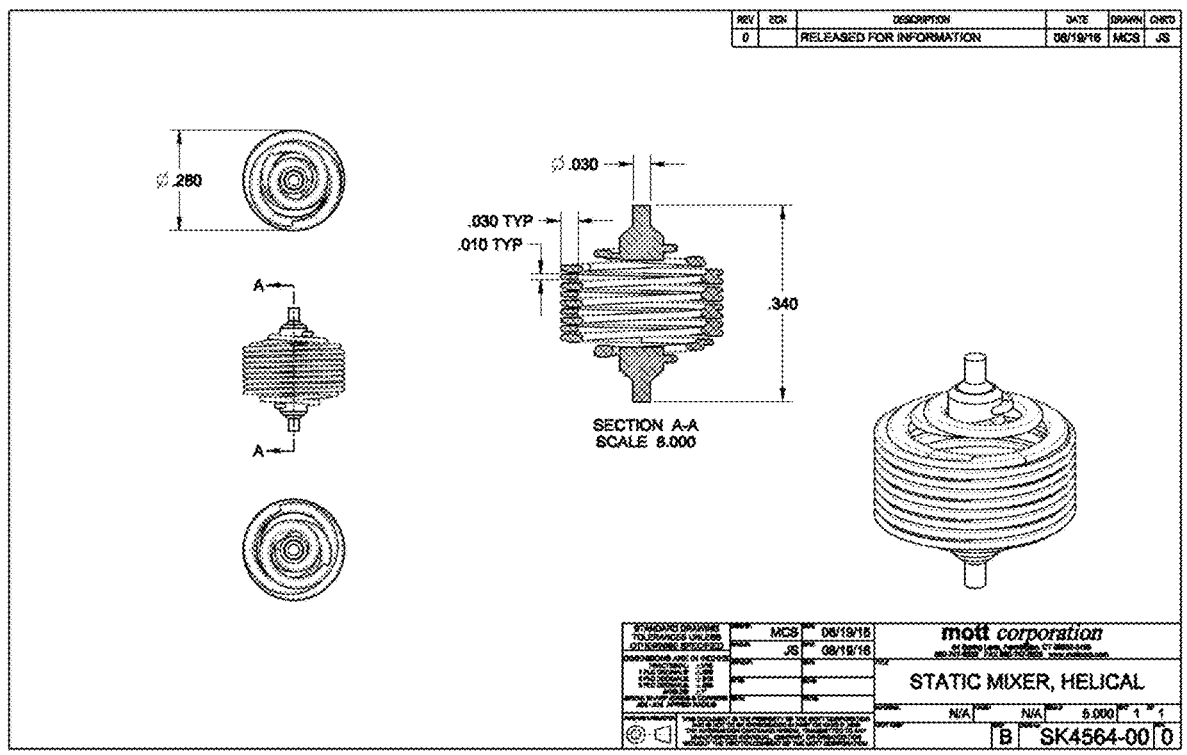
FIG. 13a illustrates an exemplary embodiment of a mixer element, according to some embodiments of the present disclosure.
Figure 13B:
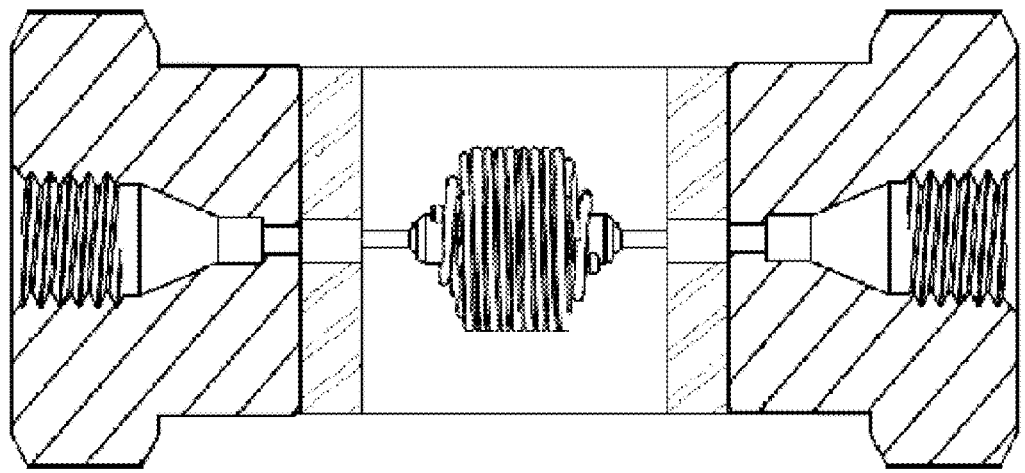
FIG. 13b illustrates an exemplary embodiment of a static mixer assembly, according to some embodiments of the present disclosure.

In this example, we have a center mixing housing that contains one coil pattern mixer, as shown in FIG. 13, with 0.062" diameter by 0.062" long chambers that were intentionally left open. FIG. 13*a* shows detail of the coil pattern mixing element, and FIG. 13*b* shows the use of this mixing element as part of an example static mixer assembly. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹/₁₆" OD tubing. The internal volume of this assembly is roughly 30 microliters.

Example 48

For this example, we have the same coil type mixing device and hardware as in Example 47 with the exception of the cavities on either side of the coil flow pattern. Here we have pressed standard Mott media grade 2 stainless steel frits for filtration and enhanced micro mixing. The internal volume of this assembly is roughly 25 microliters.

Example 49

For this example, we have the same coil type mixing device and hardware as in Example 47 with the exception of the cavities on either side of the coil flow pattern. Here we have pressed standard Mott media grade 10 stainless steel frits for filtration and enhanced micro mixing. The internal volume of this assembly is roughly 25 microliters.

Example 50

For this example, we have the same coil type mixing device and hardware as in Example 48 with the exception of the coil flow pattern. Here we have filled the flow channels with stainless steel with an average pore size of 2 micrometers for enhanced micro mixing. The internal volume of this assembly is roughly 20 microliters.

Example 51

For this example, we have the same coil type mixing device and hardware as in example 48 with the exception of the coil flow pattern. Here we have filled the flow channels with porous stainless steel with an average pore size of 10 micrometers for enhanced micro mixing. The internal volume of this assembly is roughly 20 microliters.

Example 52

Figure 14:
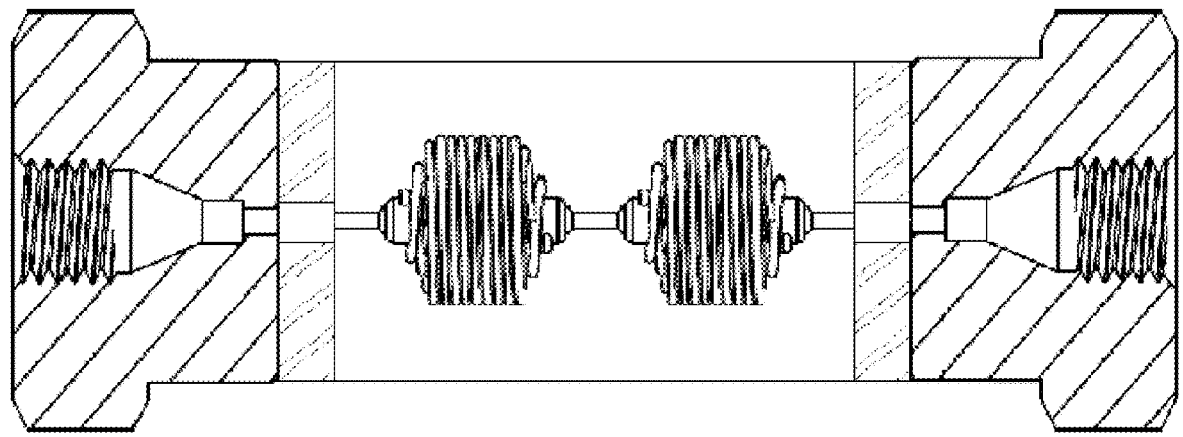
FIG. 14 illustrates an exemplary embodiment of a static mixer assembly, according to some embodiments of the present disclosure.

In this example, we have a center mixing housing that contains two coil pattern mixers, as shown in FIG. 14, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹⁄₁₆" OD tubing. The internal volume of this assembly is roughly 60 microliters.

Example 53

For this example, we have the same coil type mixing device and hardware as in Example 52 with the exception of the cavities on either side of the coil flow pattern mixers. Here we have pressed standard Mott media grade 2 stainless steel frits for filtration and enhanced micro mixing. The internal volume of this assembly is roughly 55 microliters.

Example 54

For this example, we have the same coil type mixing device and hardware as in Example 52 with the exception of the cavities on either side of the coil flow pattern mixers. Here we have pressed standard Mott media grade 10 stainless steel frits for filtration and enhanced micro mixing. The internal volume of this assembly is roughly 55 microliters.

Example 55

For this example, we have the same coil type mixing device and hardware as in Example 52 with the exception of the coil flow pattern. Here we have filled the flow channel with porous stainless steel with an average pore size of 2 micrometers for enhanced micro mixing. The internal volume of this assembly is roughly 45 microliters.

Example 56

For this example, we have the same coil type mixing device and hardware as in Example 53 with the exception of the coil flow pattern. Here we have filled the flow channels with porous stainless steel with an average pore size of 10 micrometers for enhanced micro mixing. The internal volume of this assembly is roughly 45 microliters.

Example 57

Figure 15:
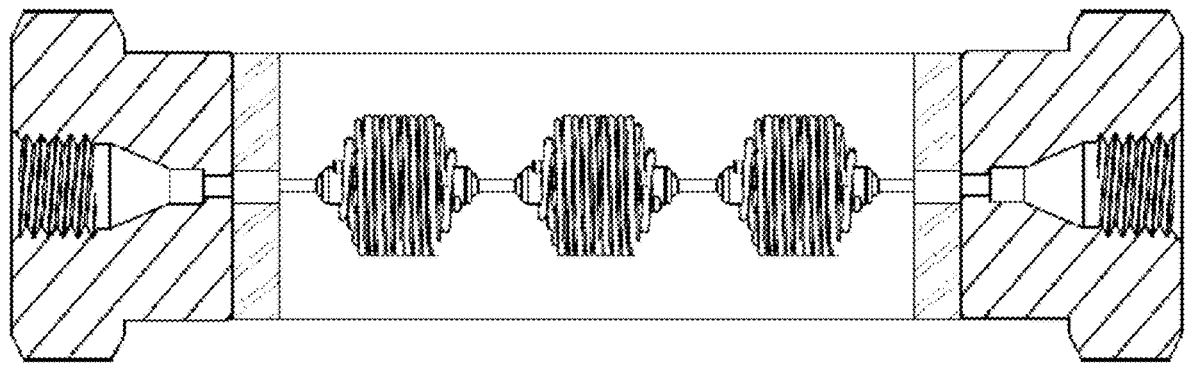
FIG. 15 illustrates an exemplary embodiment of a static mixer assembly, according to some embodiments of the present disclosure.
Figure 16A:
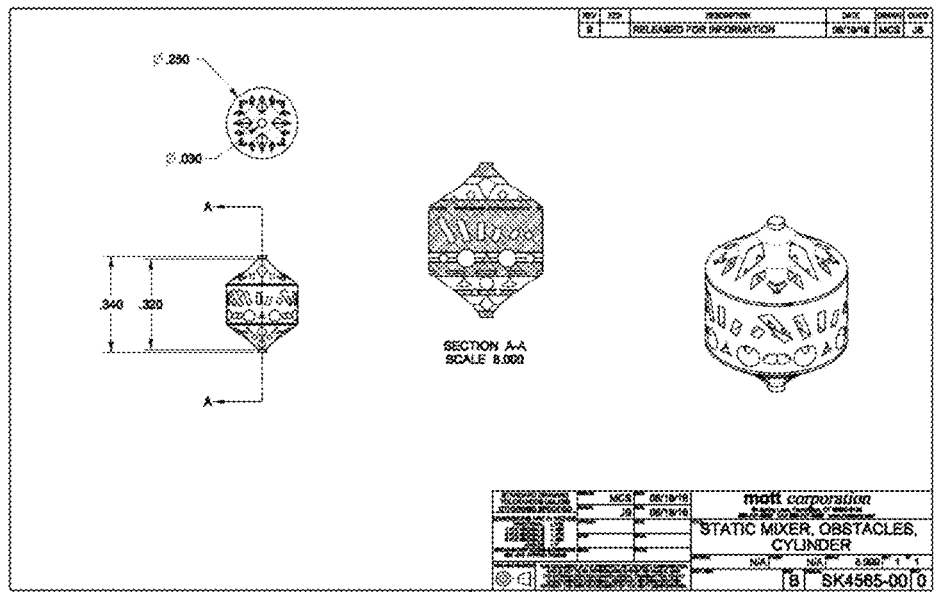
FIG. 16a, FIG. 16b, and FIG. 16c illustrate exemplary embodiments of static mixers, according to some embodiments of the present disclosure.
Figure 16B:
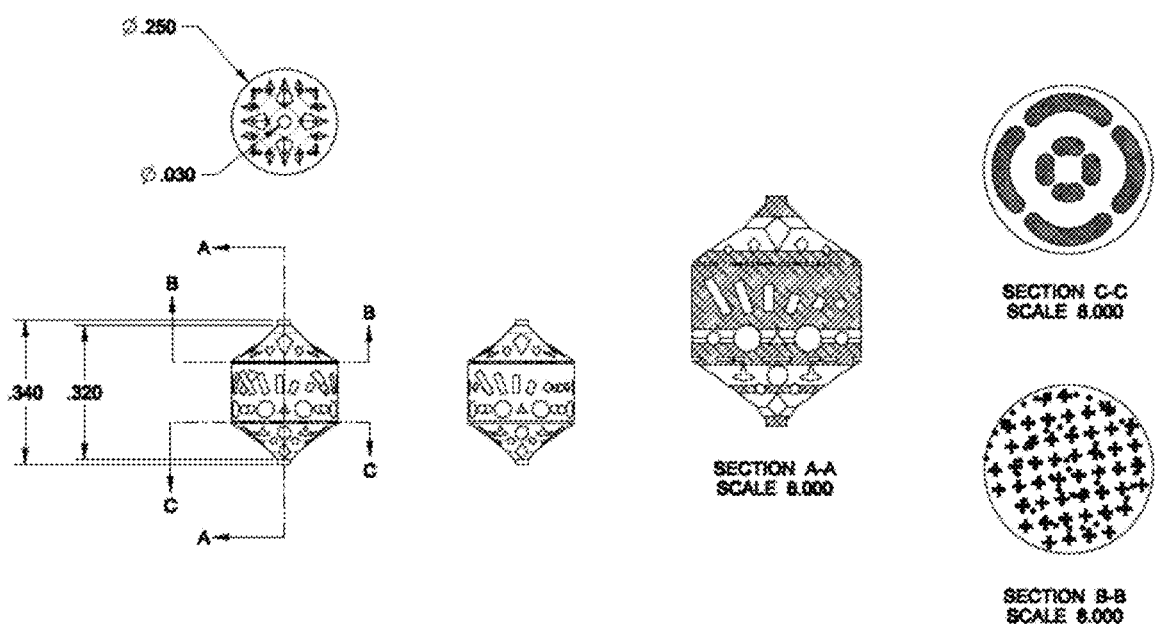
Figure 16C:
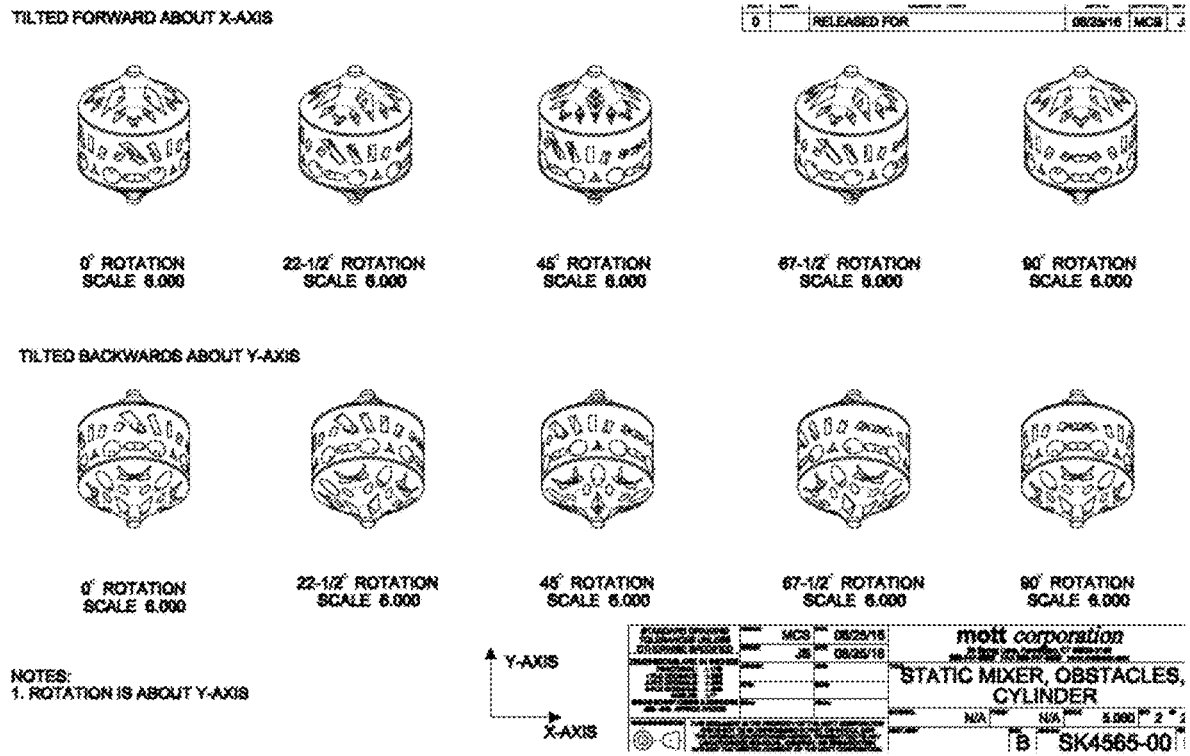
Figure 16D:
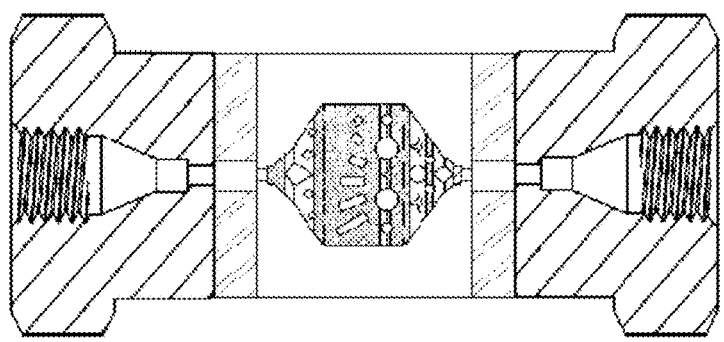
FIG. 16d illustrates an exemplary embodiment of a static mixer assembly, according to some embodiments of the present disclosure.

In this example, we have a center mixing housing that contains three coil pattern mixers, as shown in FIG. 15, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹⁄₁₆" OD tubing. The internal volume of this assembly is roughly 90 microliters.

Example 58

For this example, we have the same coil type mixing device and hardware as in Example 57 with the exception of the cavities on either side of the coil flow pattern mixers. Here we have pressed standard Mott media grade 2 stainless steel frits for filtration and enhanced micro mixing. The internal volume of this assembly is roughly 85 microliters.

Example 59

For this example, we have the same coil type mixing device and hardware as in Example 57 with the exception of the cavities on either side of the coil flow pattern mixers. Here we have pressed standard Mott media grade 10 stainless steel frits for filtration and enhanced micro mixing. The internal volume of this assembly is roughly 85 microliters.

Example 60

For this example, we have the same coil type mixing device and hardware as in Example 58 with the exception of the coil flow pattern. Here we have filled the flow channel with porous stainless steel with an average pore size of 2 micrometers for enhanced micro mixing. The internal volume of this assembly is roughly 75 microliters.

Example 61

For this example, we have the same coil type mixing device and hardware as in Example 58 with the exception of the coil flow pattern. Here we have filled the flow channels with porous stainless steel with an average pore size of 10 micrometers for enhanced micro mixing. The internal volume of this assembly is roughly 75 microliters.

Examples 62-76 use what the applicants refer to as a cylindrical design for the mixing process. This design employs a cylinder with cones at each end with a short cylindrical flow path at the tip of each end. The cylindrical tips at each end of the device are the inlet and outlets for the fluid flow. A variety of shapes are formed through the cylinder perpendicular to the nominal flow direction, which shapes act to form obstructions that impede flow and create mixing. These shapes include squares, rectangles, triangles, circles, diamonds, stars and any other geometry desired. The size and spacing of some of the shapes are intentionally varied to make the flow rate across the device non-symmetrical, to assist in phase shifting of the fluid during the mixing process. The obstructions traveling through cylindrical-cone shape device are repeated with a 90-degree rotation of the cylinder so that flow occurs in two dimensions while flowing longitudinally through the device. It should be appreciated that the figures that correspond to Examples 62-76 are drawn for ease of illustration to depict the obstructions as void space, and to further depict open space as solid material. At the interface between the cylindrical and the cone sections, a thin plate with numerous holes parallel to the flow direction is inserted for additional mixing (like a sieve). The shapes of these holes can be round, square, and any desired geometries and are typically less than 0.020" in lateral dimensions. In the following examples, one, two, or three of these devices were placed in series into assemblies with and without porous media for testing purposes. All materials used for the cylinder mixer design were 316L Stainless steel and it should be noted that any alloys suitable for HPLC applications can be used such as Hastelloy and titanium alloys, as well as polymers and ceramics may be used.

Example 62

In this example, we have a center mixing housing that contains one cylinder pattern mixer, as shown in FIG. 16, with 0.062" diameter by 0.062" long chambers that were intentionally left open. FIGS. 16a-16c shows detail of the cylinder pattern mixing element, and FIG. 16d shows the use of this mixing element as part of an example static mixer assembly. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹⁄₁₆" OD tubing. The internal volume of this assembly is roughly 60 microliters.

Example 63

For this example, we have the same cylinder type mixing device and hardware as in Example 62 with the exception of the cavities on either side of the cylinder flow pattern. Here we have pressed standard Mott media grade 2 stainless steel frits for filtration and enhanced micro mixing. The internal volume of this assembly is roughly 55 microliters.

Example 64

For this example, we have the same cylinder type mixing device and hardware as in Example 62 with the exception of the cavities on either side of the cylinder flow pattern. Here we have pressed standard Mott media grade 10 stainless steel frits for filtration and enhanced micro mixing. The internal volume of this assembly is roughly 55 microliters.

Example 65

For this example, we have the same cylinder type mixing device and hardware as in example 63 with the exception of the cylinder flow pattern. Here we have filled the flow path with stainless steel with an average pore size of 2 micrometers for enhanced micro mixing. The internal volume of this assembly is roughly 50 microliters.

Example 66

For this example, we have the same cylinder type mixing device and hardware as in example 63 with the exception of the cylinder flow pattern. Here we have filled the flow path with porous stainless steel with an average pore size of 10 micrometers for enhanced micro mixing. The internal volume of this assembly is roughly 50 microliters.

Example 67

Figure 17:
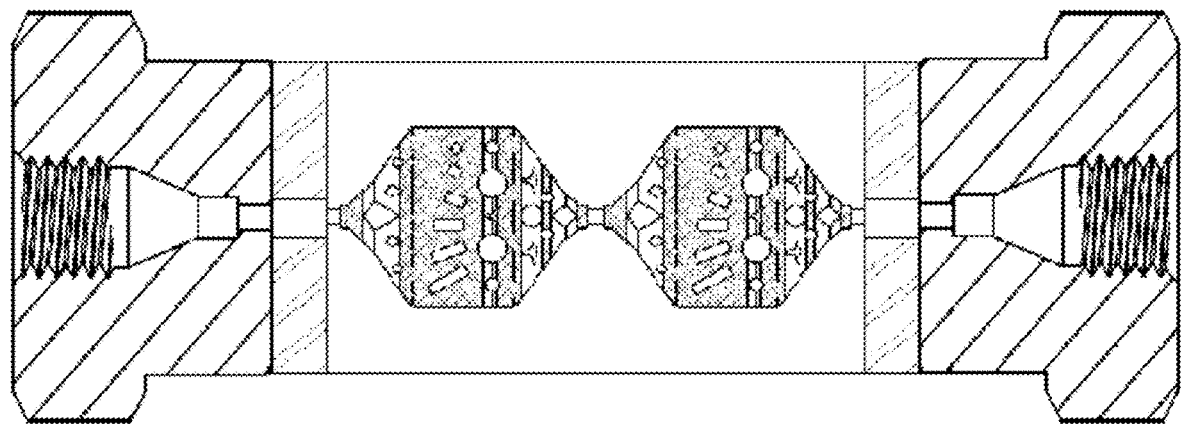
FIG. 17 illustrates an exemplary embodiment of a static mixer assembly, according to some embodiments of the present disclosure.

In this example, we have a center mixing housing that contains two cylinder pattern mixers, as shown in FIG. 17, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹⁄₁₆" OD tubing. The internal volume of this assembly is roughly 120 microliters.

Example 68

For this example, we have the same cylinder type mixing device and hardware as in Example 67 with the exception of the cavities on either side of the cylinder flow pattern mixers. Here we have pressed standard Mott media grade 2 stainless steel frits for filtration and enhanced micro mixing. The internal volume of this assembly is roughly 115 microliters.

Example 69

For this example, we have the same cylinder type mixing device and hardware as in Example 67 with the exception of the cavities on either side of the cylinder flow pattern mixers. Here we have pressed standard Mott media grade 10 stainless steel frits for filtration and enhanced micro mixing. The internal volume of this assembly is roughly 115 microliters.

Example 70

For this example, we have the same cylinder type mixing device and hardware as in Example 68 with the exception of the cylinder flow pattern. Here we have filled the flow path with porous stainless steel with an average pore size of 2 micrometers for enhanced micro mixing. The internal volume of this assembly is roughly 110 microliters.

Example 71

For this example, we have the same cylinder type mixing device and hardware as in Example 68 with the exception of the cylinder flow pattern. Here we have filled the flow path with porous stainless steel with an average pore size of 10 micrometers for enhanced micro mixing. The internal volume of this assembly is roughly 110 microliters.

Example 72

Figure 18:
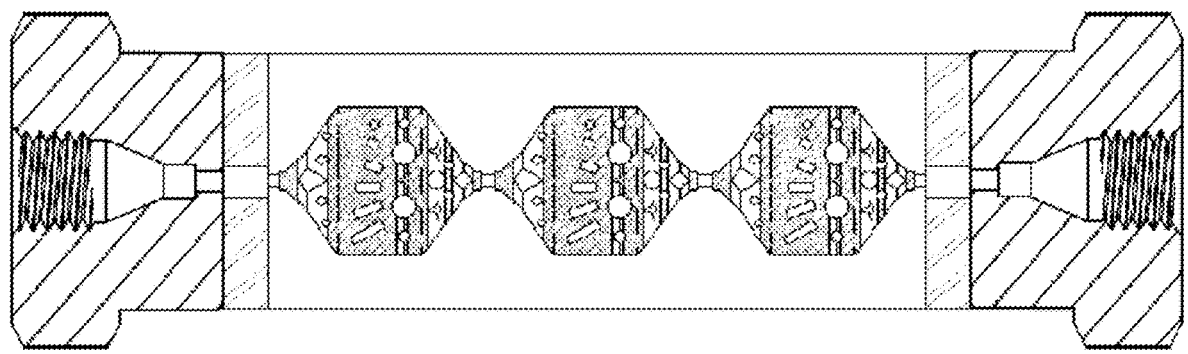
FIG. 18 illustrates an exemplary embodiment of a static mixer assembly, according to some embodiments of the present disclosure.

In this example, we have a center mixing housing that contains three cylinder pattern mixers, as shown in FIG. 18, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹⁄₁₆" OD tubing. The internal volume of this assembly is roughly 180 microliters.

Example 73

For this example, we have the same cylinder type mixing device and hardware as in example 72 with the exception of the cavities on either side of the cylinder flow pattern mixers. Here we have pressed standard Mott media grade 2 stainless steel frits for filtration and enhanced micro mixing. The internal volume of this assembly is roughly 175 microliters.

Example 74

For this example, we have the same cylinder type mixing device and hardware as in Example 72 with the exception of the cavities on either side of the cylinder flow pattern mixers. Here we have pressed standard Mott media grade 10 stainless steel frits for filtration and enhanced micro mixing. The internal volume of this assembly is roughly 175 microliters.

Example 75

For this example, we have the same cylinder type mixing device and hardware as in Example 73 with the exception of the cylinder flow pattern. Here we have filled the flow channel with porous stainless steel with an average pore size of 2 micrometers for enhanced micro mixing. The internal volume of this assembly is roughly 165 microliters.

Example 76

For this example, we have the same cylinder type mixing device and hardware as in Example 73 with the exception of the cylinder flow pattern. Here we have filled the flow channels with porous stainless steel with an average pore size of 10 micrometers for enhanced micro mixing. The internal volume of this assembly is roughly 165 microliters.

In Examples 77-91, static mixer elements of the present invention make use of what the applicants refer to as a prism design for the mixing process. This design makes use of thin plate with angled ends with cones attached on each end with a short cylindrical flow path at the tip of each end. The cylindrical tips at each end of the device are the inlet and outlets for the fluid flow. A variety of shapes are placed through the flat plat perpendicular to the nominal flow direction to impede flow and create mixing. These shapes include squares, rectangles, triangles, circles, diamonds, stars and any other geometry desired. The size and spacing of some of the shapes are intentionally varied to make the flow rate across the device not symmetrical to assist in phase shifting of the fluid during the mixing process. At the interface between the rectangular and the triangular sections of the plate, a thin grating with numerous holes parallel to the flow direction is inserted for additional mixing (like a sieve). The shapes of these holes can be round, square, and any desired geometries and are typically less than 0.020" in lateral dimensions. One, two, or three of these devices were placed in series into assemblies with and without porous media for testing purposes. All materials used for the prism mixer design were 316L Stainless steel and it should be noted that any alloys suitable for HPLC applications can be used such as Hastelloy and titanium alloys, as well as polymers and ceramics may be used. It should be appreciated that the figures that correspond to Examples 77-91 are drawn for ease of illustration to depict the obstructions as void space, and to further depict open space as solid material.

Example 77

Figure 19A:
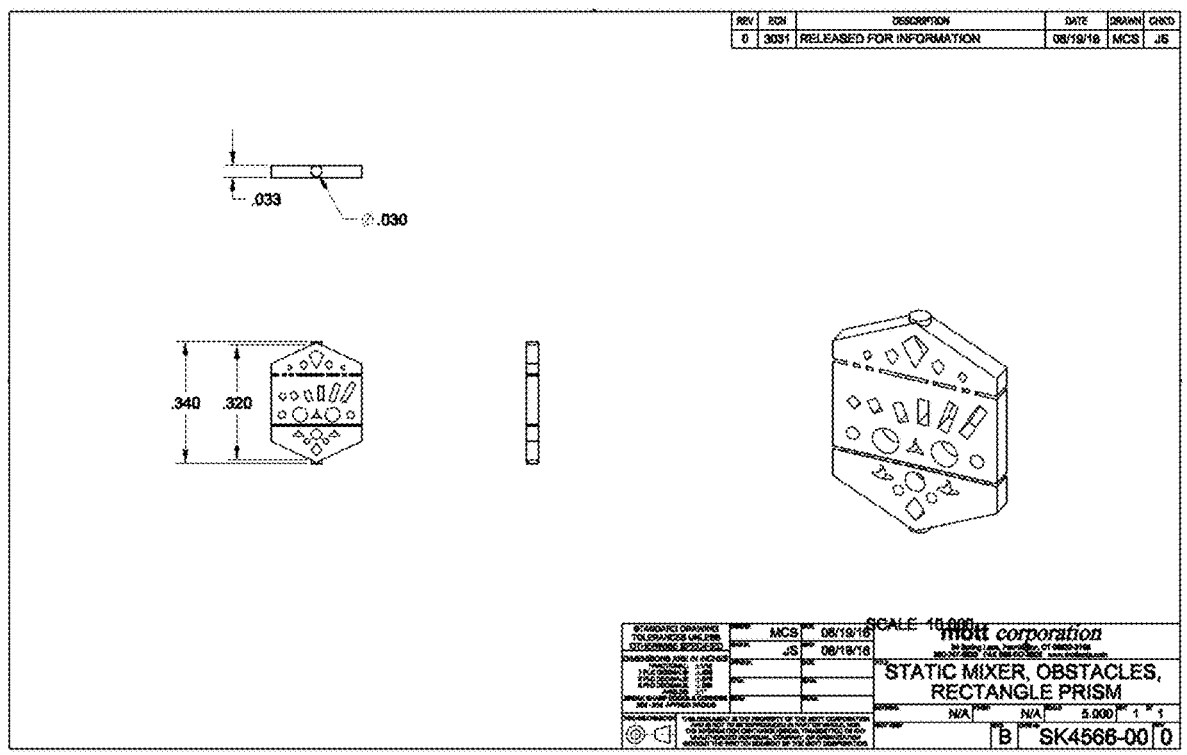
FIG. 19a illustrates an exemplary embodiment of a static mixer, according to some embodiments of the present disclosure.
Figure 19B:
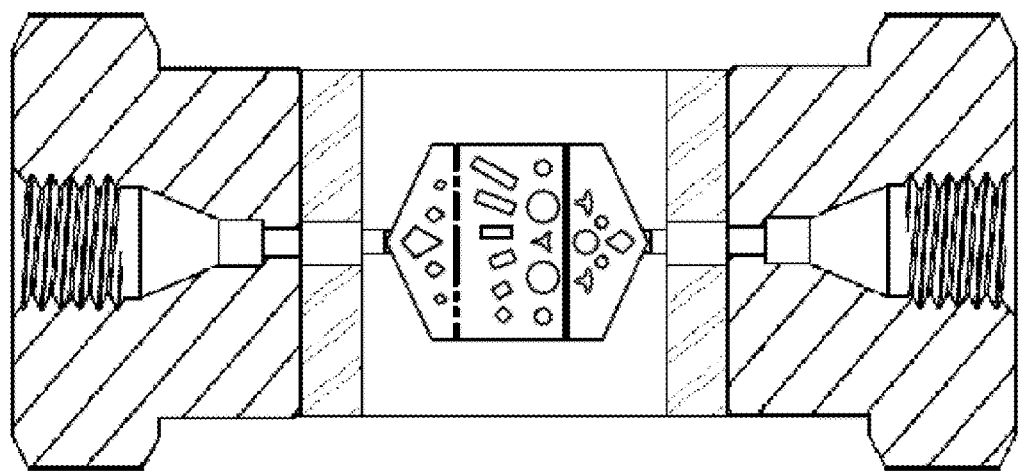
FIG. 19b illustrates an exemplary embodiment of a static mixer assembly, according to some embodiments of the present disclosure.

This example comprises a center mixing housing that contains one prism pattern mixer, as shown in FIG. 19, with 0.062" diameter by 0.062" long chambers that were intentionally left open. FIG. 19a shows detail of the prism pattern mixing element, and FIG. 19b shows the use of this mixing element as part of an example static mixer assembly. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹⁄₁₆" OD tubing. The internal volume of this assembly is roughly 30 microliters.

Example 78

For this example, we have the same prism type mixing device and hardware as in Example 76 with the exception of the cavities on either side of the prism flow pattern. Here we have pressed standard Mott media grade 2 stainless steel frits for filtration and enhanced micro mixing. The internal volume of this assembly is roughly 25 microliters.

Example 79

For this example, we have the same prism type mixing device and hardware as in Example 77 with the exception of the cavities on either side of the prism flow pattern. Here we have pressed standard Mott media grade 10 stainless steel frits for filtration and enhanced micro mixing. The internal volume of this assembly is roughly 25 microliters.

Example 80

For this example, we have the same prism type mixing device and hardware as in Example 78 with the exception of the prism flow pattern. Here we have filled the flow path with stainless steel with an average pore size of 2 micrometers for enhanced micro mixing. The internal volume of this assembly is roughly 20 microliters.

Example 81

For this example, we have the same prism type mixing device and hardware as in Example 78 with the exception of the prism flow pattern. Here we have filled the flow path with porous stainless steel with an average pore size of 10 micrometers for enhanced micro mixing. The internal volume of this assembly is roughly 20 microliters.

Example 82

Figure 20:
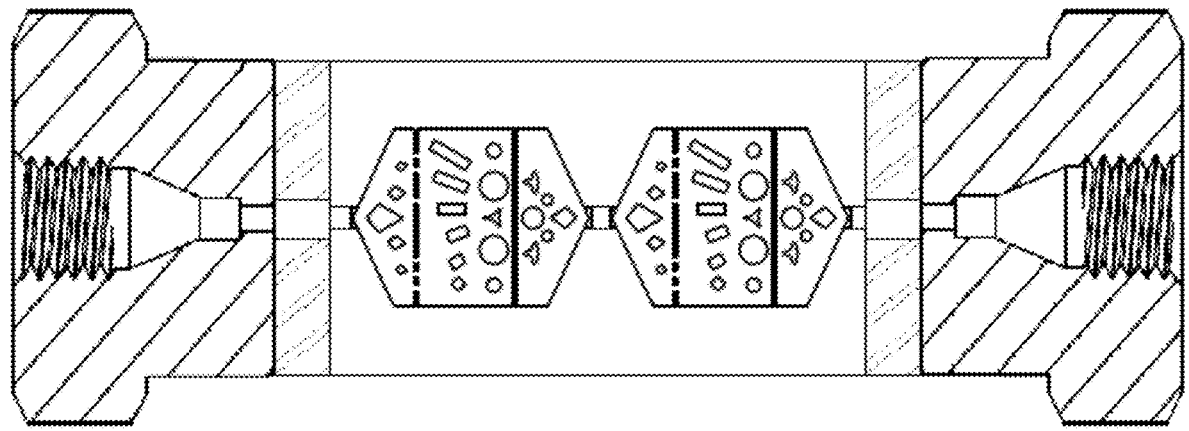
FIG. 20 illustrates an exemplary embodiment of a static mixer assembly, according to some embodiments of the present disclosure.

In this example, we have a center mixing housing that contains two prism pattern mixers, as shown in FIG. 20, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ¹⁄₁₆" OD tubing. The internal volume of this assembly is roughly 60 microliters.

Example 83

For this example, we have the same prism type mixing device and hardware as in Example 82 with the exception of the cavities on either side of the prism flow pattern mixers. Here we have pressed standard Mott media grade 2 stainless steel frits for filtration and enhanced micro mixing. The internal volume of this assembly is roughly 55 microliters.

Example 84

For this example, we have the same prism type mixing device and hardware as in Example 82 with the exception of the cavities on either side of the prism flow pattern mixers. Here we have pressed standard Mott media grade 10 stainless steel frits for filtration and enhanced micro mixing. The internal volume of this assembly is roughly 55 microliters.

Example 85

For this example, we have the same prism type mixing device and hardware as in Example 83 with the exception of the prism flow pattern. Here we have filled the flow path with porous stainless steel with an average pore size of 2 micrometers for enhanced micro mixing. The internal volume of this assembly is roughly 55 microliters.

Example 86

For this example, we have the same prism type mixing device and hardware as in Example 83 with the exception of the prism flow pattern. Here we have filled the flow path with porous stainless steel with an average pore size of 10 micrometers for enhanced micro mixing. The internal volume of this assembly is roughly 50 microliters.

Example 87

Figure 21:
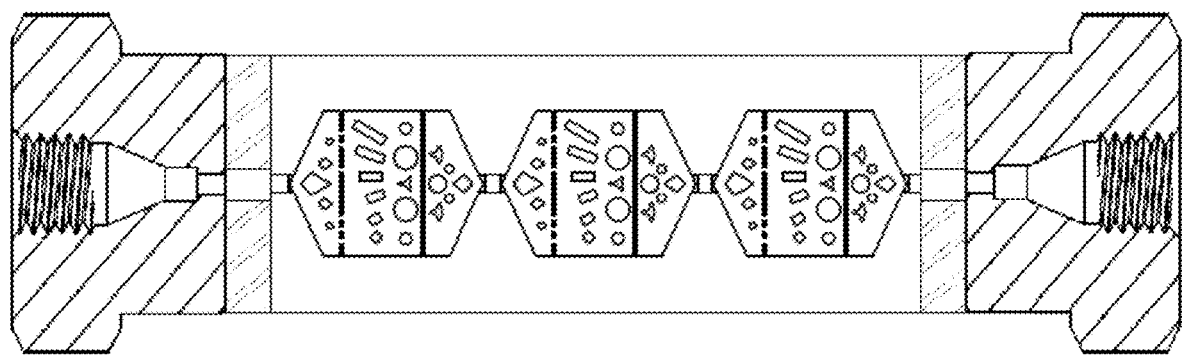
FIG. 21 illustrates an exemplary embodiment of a static mixer assembly, according to some embodiments of the present disclosure.

In this example, we have a center mixing housing that contains three prism pattern mixers, as shown in FIG. 21, with 0.062" diameter by 0.062" long chambers that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with $\frac{1}{16}$" OD tubing. The internal volume of this assembly is roughly 90 microliters.

Example 88

For this example, we have the same prism type mixing device and hardware as in Example 87 with the exception of the cavities on either side of the prism flow pattern mixers. Here we have pressed standard Mott media grade 2 stainless steel frits for filtration and enhanced micro mixing. The internal volume of this assembly is roughly 85 microliters.

Example 89

For this example, we have the same prism type mixing device and hardware as in Example 87 with the exception of the cavities on either side of the prism flow pattern mixers. Here we have pressed standard Mott media grade 10 stainless steel frits for filtration and enhanced micro mixing. The internal volume of this assembly is roughly 85 microliters.

Example 90

For this example, we have the same prism type mixing device and hardware as in Example 88 with the exception of the prism flow pattern. Here we have filled the flow channel with porous stainless steel with an average pore size of 2 micrometers for enhanced micro mixing. The internal volume of this assembly is roughly 80 microliters.

Example 91

For this example, we have the same prism type mixing device and hardware as in Example 88 with the exception of the prism flow pattern. Here we have filled the flow channels with porous stainless steel with an average pore size of 10 micrometers for enhanced micro mixing. The internal volume of this assembly is roughly 80 microliters.

Figure 25:
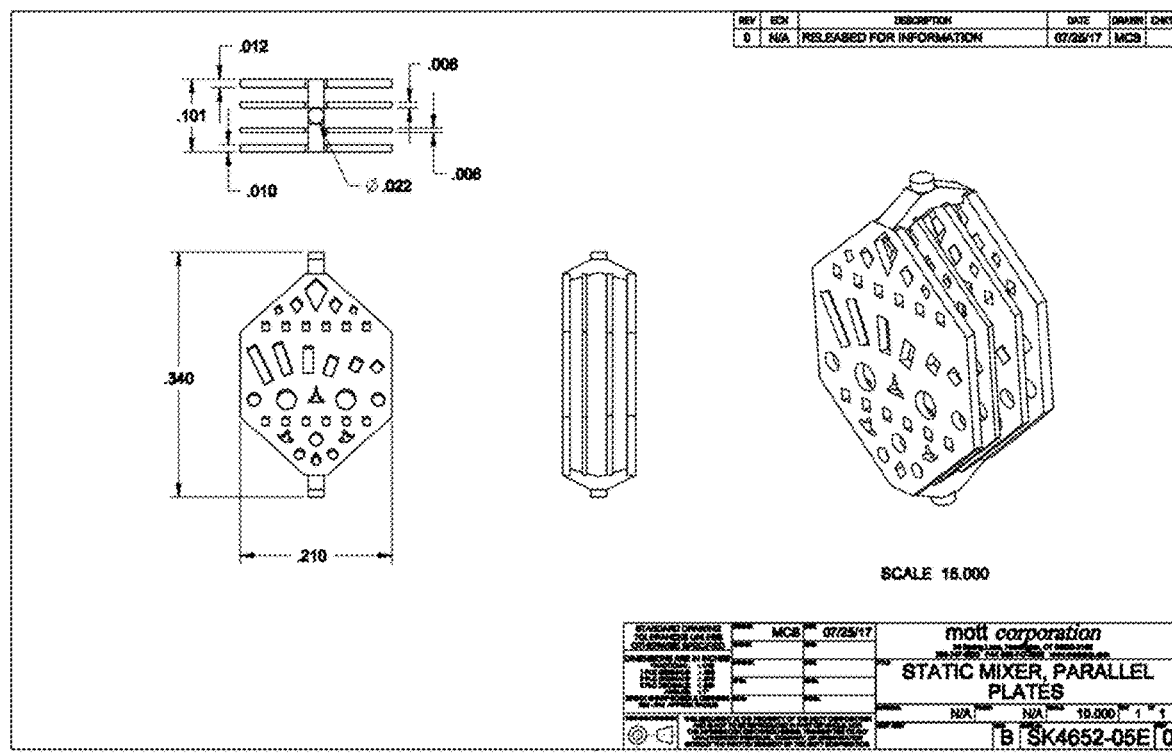
FIG. 25 illustrates an exemplary embodiment of a static mixer, according to some embodiments of the present disclosure.

A variation of the static mixers described in Examples 77-91 is generally shown in FIG. 25 and described in Examples 92-96. Here we have prism-like void spaces similar to those described in Examples 77-91, but instead of just one channel flow path with a variety of geometrical flow obstructions, we have multiple parallel flow paths with obstructions extending therethrough. The flow paths are connected to each other by common manifolds and the inlet and outlet ends of the device. Although the embodiments described in FIG. 25 and Examples 92-96 make use of four parallel flow paths (depicted as solid space in the figures), it should be appreciated that any suitable number of parallel flow paths may be used, such as two, three, four, five, six, seven, eight, nine, or ten or more. Moreover, although the shape of the void spaces described in FIG. 25 and Examples 92-96 is octagonal, it should be appreciated that any suitably shaped spaces may be employed, such as triangular, square, rectangular, or other regular or irregular polygon. In any embodiment, the void spaces may be the same or differently shaped, and the obstructions therein may be the same or different from those used in other void spaces. In various embodiments, the thickness of each flow path varies from 0.006 inches to 0.012 inches, and may be the same or different from each other. In some cases, these parallel flow paths can be fabricated all with the same thickness targeting 0.009" for a mixer with an internal volume of 50 micro liters if desired. In certain embodiments, the internal volume is roughly 40 micro liters. If one has the need to lower the internal volume, then the thickness of the parallel flow plates could be reduced or one or more of the plates could be removed resulting in a mixing module with internal volumes approaching roughly 5 micro liters. In cases where larger internal volumes are desired, the thickness of the parallel flow paths may be increased and/or additional parallel flow paths could be added providing internal volumes for this design to easily exceed 250 micro liters. As was presented in earlier examples, static mixers can be fabricated using 1 or more of these mixing modules in series expanding the range of internal volumes for static mixers from 5 microliters (one module with reduced plate thickness and quantities) up to for example 1250 micro liters (six parallel flow paths, increased plate thickness, and five modules in series).

In certain embodiments, the thickness of these individual flow paths may be as low at 0.001 inches and as high as 0.1 inches with preferred thickness ranging from about 0.006 inches through 0.012 inches for this design. As was the case in previous examples, the internal void spaces can be left open or filled with porous metal to improve micro mixing and to reduce the internal volume of the device. Additionally, the 0.062 counter bores at the inlet and outlet ends can be filed with standard metal frits to act as filters to prevent debris in the fluid stream from entering or leaving the device. These inlet/outlet frits and porous media within the internal cavities can be any Mott media grade from 0.1 through 40 with preferred values being Mott standard grades or 2 or 10. Installation of inlet and/or outlet frits also can reduce the internal volume of the device and provide improved micro mixing.

In the following examples, 1-5 of these devices were placed in series into assemblies and porous media for testing purposes. All materials used for the prism mixer design were either 316L stainless steel or titanium and it should be noted that any alloys suitable for HPLC applications can be used such as Hastelloy and titanium alloys, as well as polymers and ceramics. It should be appreciated that the figures that correspond to Examples 92-96 are drawn for ease of illustration to depict the obstructions as void space, and to further depict open space as solid material.

Example 92

Figure 26:
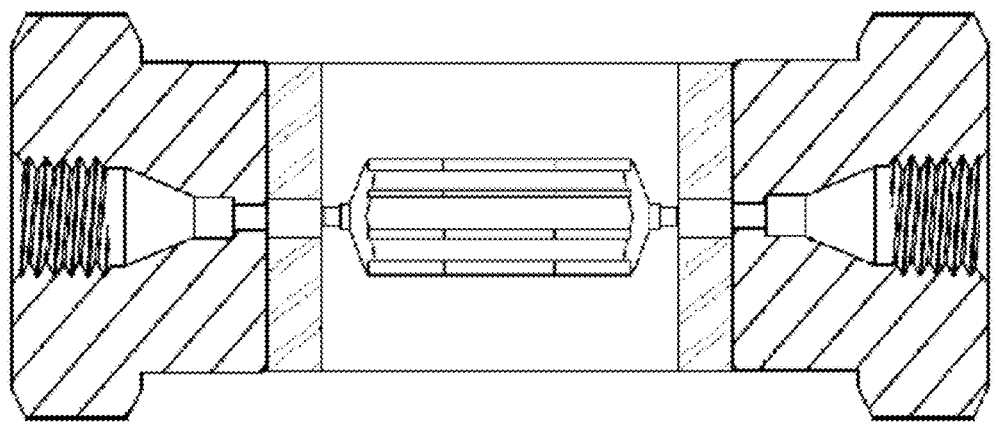
FIG. 26 illustrates an exemplary embodiment of a static mixer assembly, according to some embodiments of the present disclosure.

In this example shown in FIG. 26, we have a center mixing housing that contains one parallel plate prism pattern mixer with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 40 micro liters.

Example 93

Figure 27:
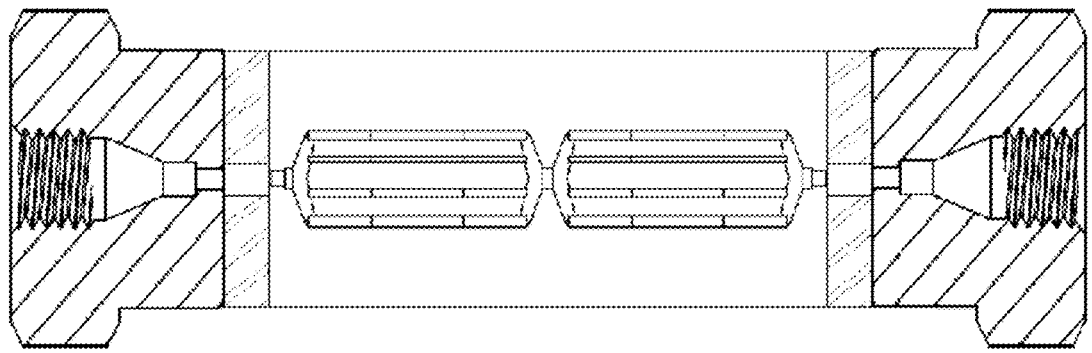
FIG. 27 illustrates an exemplary embodiment of a static mixer assembly, according to some embodiments of the present disclosure.

In this example shown in FIG. 27, we have a center mixing housing that contains two parallel plate prism pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 40 micro liters.

Example 94

Figure 28:
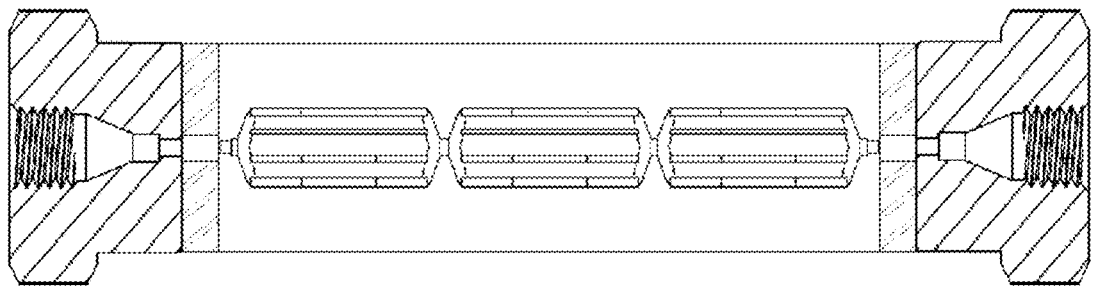
FIG. 28 illustrates an exemplary embodiment of a static mixer assembly, according to some embodiments of the present disclosure.

In this example shown in FIG. 28, we have a center mixing housing that contains three parallel plate prism pattern mixers in series with 0.062" diameter by 0.062" long chambers that were intentionally left open. Attached to the inlet and outlet sides of the mixing chambers at both ends we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 120 micro liters.

Example 95

Figure 29:
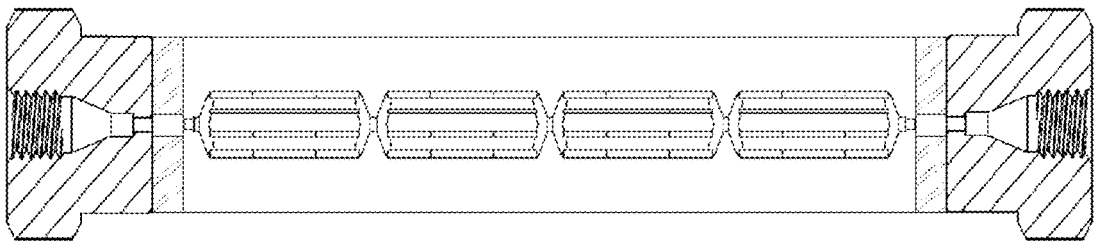
FIG. 29 illustrates an exemplary embodiment of a static mixer assembly, according to some embodiments of the present disclosure.

In this example shown in FIG. 29, we have a center mixing housing that contains four parallel plate prism pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 160 micro liters.

Example 96

Figure 30:
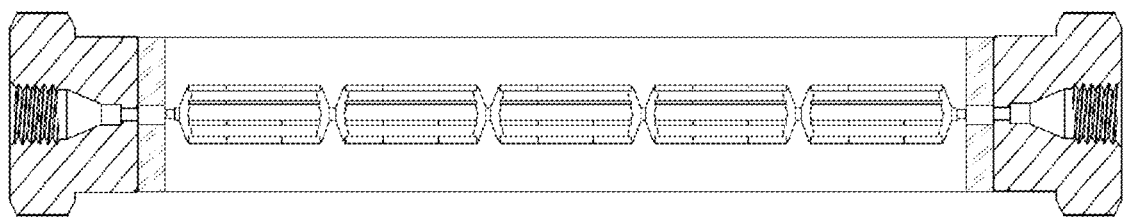
FIG. 30 illustrates an exemplary embodiment of a static mixer assembly, according to some embodiments of the present disclosure.

In this example shown in FIG. 30, we have a center mixing housing that contains five parallel plate prism pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 200 micro liters.

Figure 31:
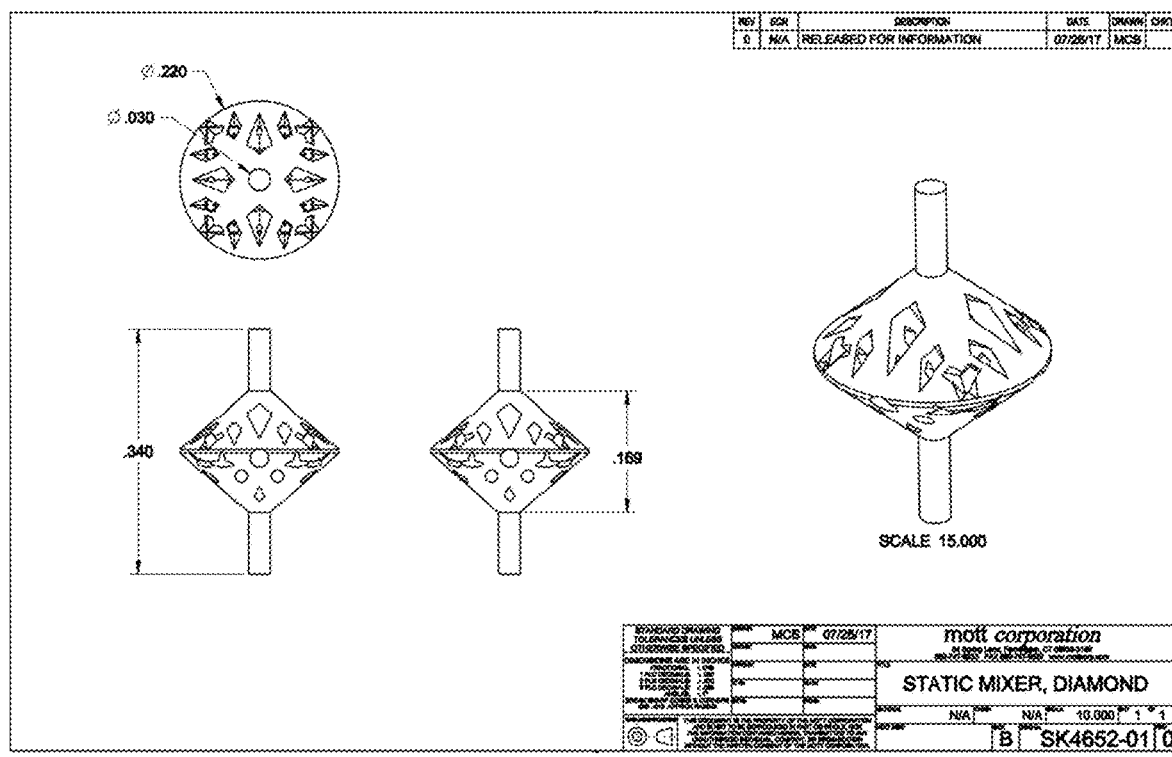
FIG. 31 illustrates an exemplary embodiment of a static mixer, according to some embodiments of the present disclosure.

A variation of the static mixers described in Examples 62-76 were developed in which the center cylindrical section was removed, resulting in a diamond like overall shape as generally shown in FIG. 31 and described in Examples 97-99. This modification was made to ease manufacturing and to reduce internal volume. In certain embodiments, we have two cones attached to each other by their bases with a short cylindrical flow path at the tip of each end. The cylindrical tips at each end of the device are the inlet and outlets for the fluid flow. We then pass a variety of shapes through the cones perpendicular to the nominal flow direction to impede flow and create mixing. These shapes include squares, rectangles, triangles, circles, diamonds, stars, and may contain many other geometries if desired. We intentionally varied the size and spacing of some of the obstructions to make the flow rate across the device not symmetrical to assist in phase shifting of the fluid during the mixing process. The obstructions traveling through cylindrical-cone shape device are repeated with a 90-degree rotation of the cylinder so that flow occurs in two dimensions while flowing longitudinally through the device. At the interface between the two cone sections, is a thin plate with numerous holes parallel to the flow direction for additional mixing (like a sieve). The shapes of these holes can be round, square, and any desired geometries and are typically less than 0.020" in lateral dimensions. In the following examples, 1-3 of these devices were placed in series into assemblies with and without porous media for testing purposes. All materials used for this diamond mixer design were either 316L stainless steel or titanium and it should be noted that any alloys suitable for HPLC applications can be used such as Hastelloy and titanium alloys, as well as polymers and ceramics may be used. It should be appreciated that the figures that correspond to Examples 97-99 are drawn for ease of illustration to depict the obstructions as void space, and to further depict open space as solid material.

Example 97

Figure 32:
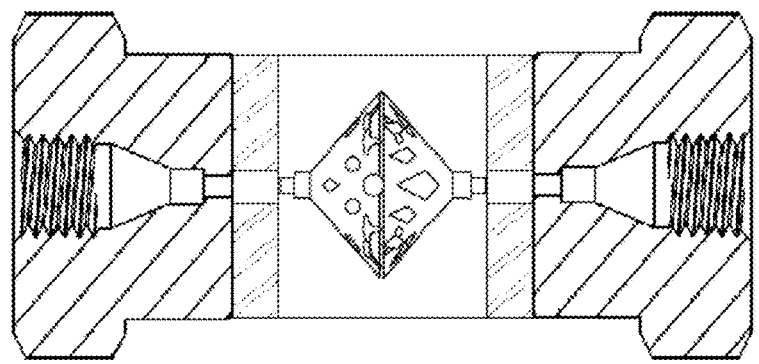
FIG. 32 illustrates an exemplary embodiment of a static mixer assembly, according to some embodiments of the present disclosure.

In this example shown in FIG. 32, we have a center mixing housing that contains one diamond pattern mixer with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 45 micro liters.

Example 98

Figure 33:
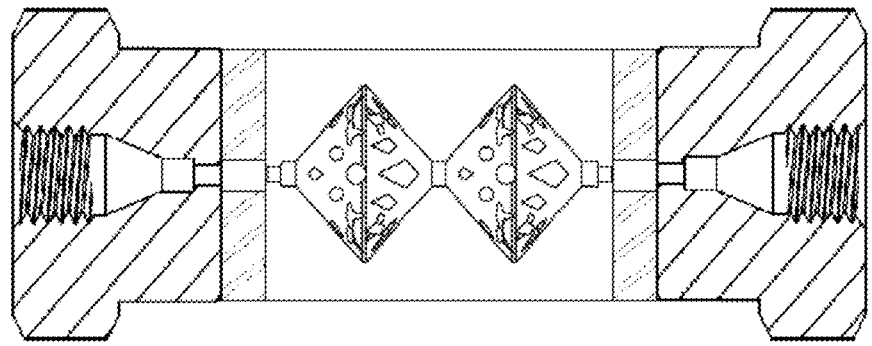
FIG. 33 illustrates an exemplary embodiment of a static mixer assembly, according to some embodiments of the present disclosure.

In this example shown in FIG. 33, we have a center mixing housing that contains two diamond pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 90 micro liters.

Example 99

Figure 34:
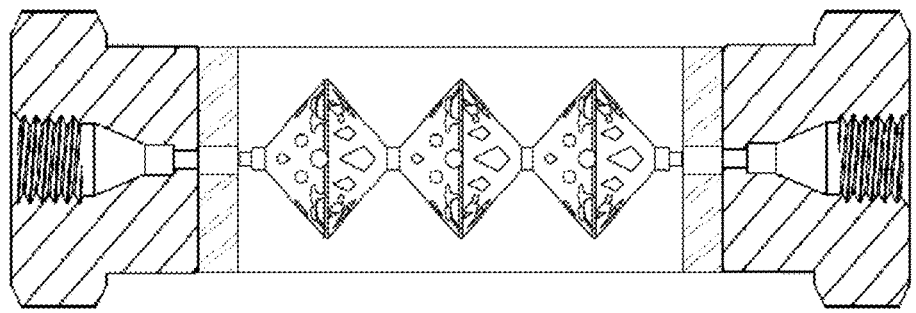
FIG. 34 illustrates an exemplary embodiment of a static mixer assembly, according to some embodiments of the present disclosure.

In this example shown in FIG. 34, we have a center mixing housing that contains three diamond pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 135 micro liters.

Figure 35:
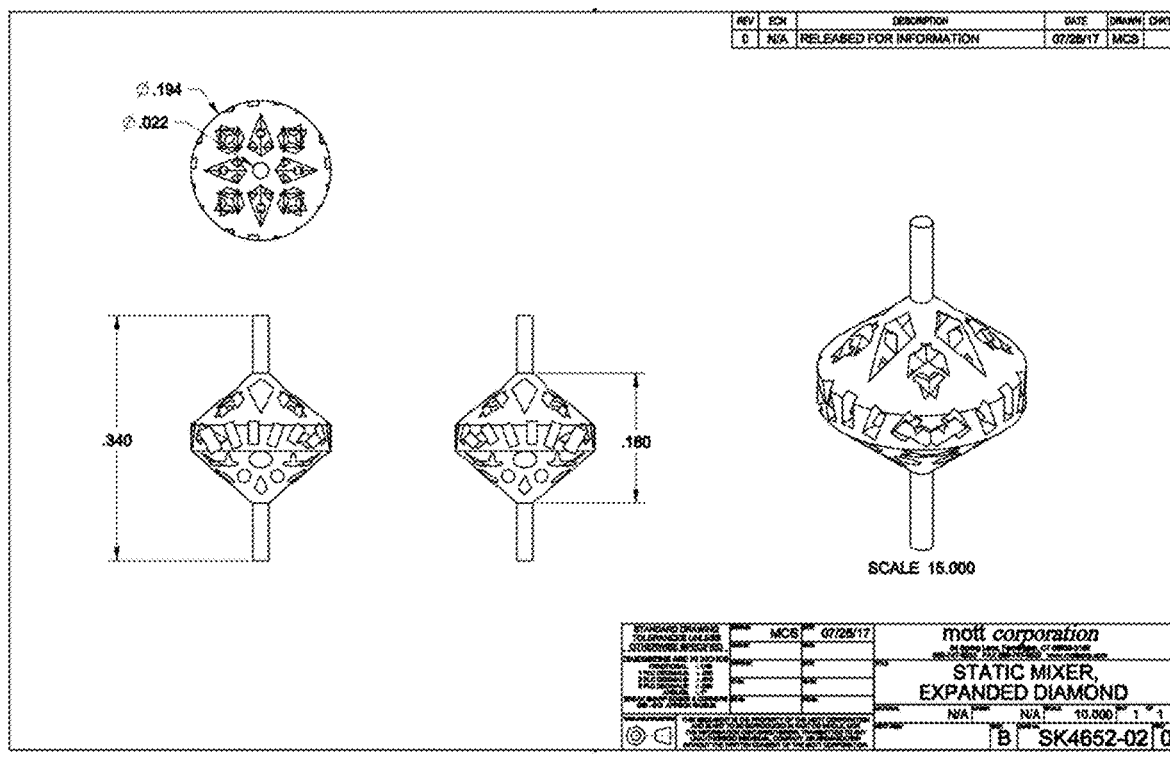
FIG. 35 illustrates an exemplary embodiment of a static mixer, according to some embodiments of the present disclosure.

In another variation of the static mixers described in Examples 62-76, the center cylindrical section was removed resulting in a smaller cylindrical center section as generally shown in FIG. 35 and described in Examples 100-102. This change was made to aid in manufacturing and to reduce internal volume. In certain embodiments, we have two cones with a short cylindrical section with rectangular flow obstructions. The cylindrical tips at each end of the device are the inlet and outlets for the fluid flow. We then pass a variety of shapes through the cones and center section perpendicular to the nominal flow direction to impede flow and create mixing. These shapes include squares, rectangles, triangles, circles, diamonds, stars, and may contain many other geometries if desired. We intentionally vary the size and spacing of some of the obstructions to make the flow rate across the device not symmetrical to assist in phase shifting of the fluid during the mixing process. The obstructions traveling through cylindrical-cone shape device are repeated with a 90-degree rotation of the cylinder so that flow occurs in two dimensions while flowing longitudinally through the device. At the interface between the cone sections and the central cylindrical section, are thin plates with numerous holes parallel to the flow direction for additional mixing (like a sieve). The shapes of these holes can be round, square, and any desired geometries and are typically less than 0.020" in lateral dimensions. In the following examples, 1-3 of these devices were placed in series into assemblies with and without porous media for testing purposes. All materials used for this mixer design were either 316L stainless steel or titanium and it should be noted that any alloys suitable for HPLC applications can be used such as Hastelloy and titanium alloys, as well as polymers and ceramics may be used. It should be appreciated that the figures that correspond to Examples 100-102 are drawn for ease of illustration to depict the obstructions as void space, and to further depict open space as solid material.

Example 100

Figure 36:
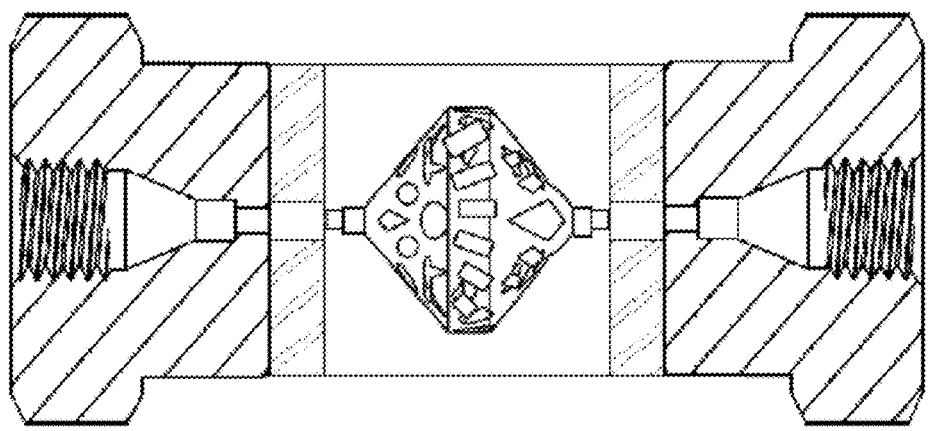
FIG. 36 illustrates an exemplary embodiment of a static mixer assembly, according to some embodiments of the present disclosure.

In this example shown in FIG. 36, we have a center mixing housing that contains one diamond pattern mixer with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 50 micro liters.

Example 101

Figure 37:
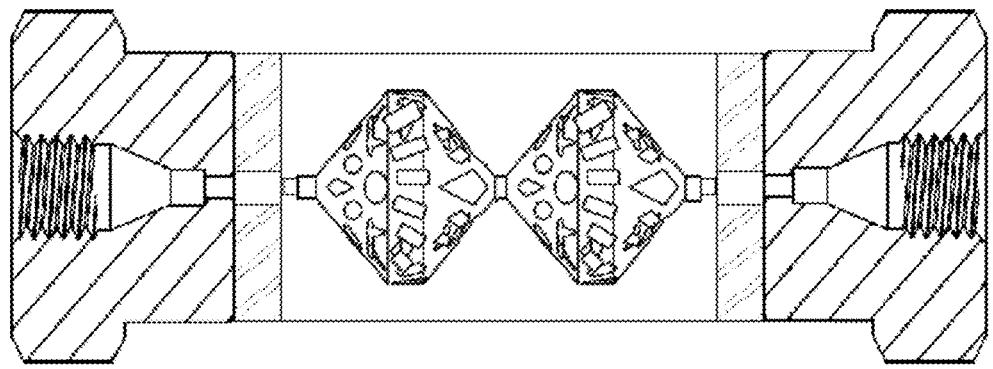
FIG. 37 illustrates an exemplary embodiment of a static mixer assembly, according to some embodiments of the present disclosure.

In this example shown in FIG. 37, we have a center mixing housing that contains two diamond pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 100 micro liters.

Example 102

Figure 38:
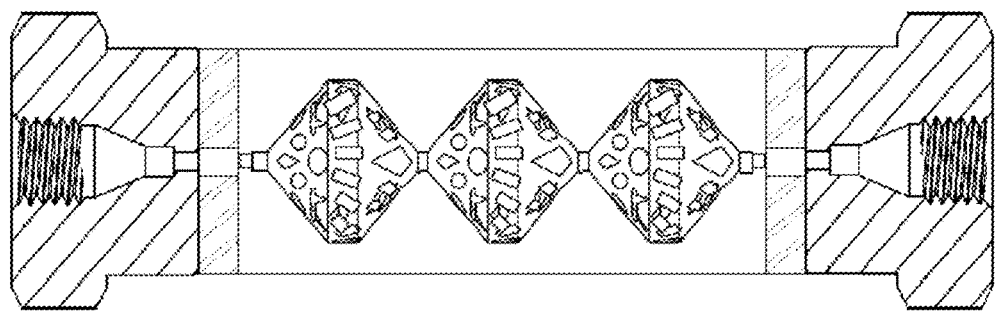
FIG. 38 illustrates an exemplary embodiment of a static mixer assembly, according to some embodiments of the present disclosure.

In this example shown in FIG. 38, we have a center mixing housing that contains three diamond pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 150 micro liters.

Figure 39:
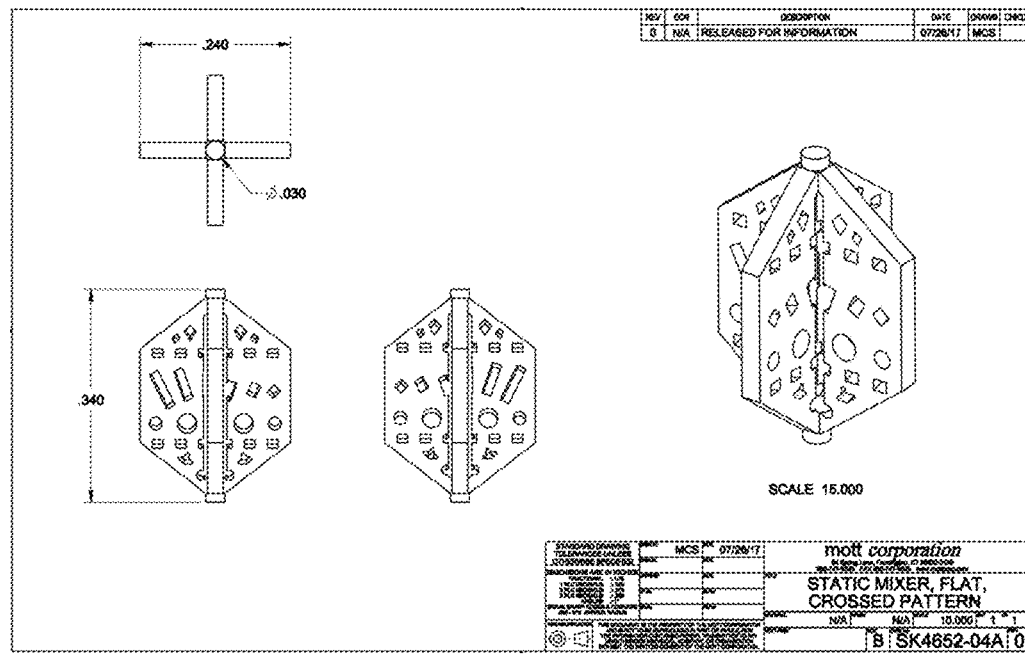
FIG. 39 illustrates an exemplary embodiment of a static mixer, according to some embodiments of the present disclosure.

A variation of the static mixers described in Examples 77 through 91 is generally shown in FIG. 39 and described in Examples 103-105. Here we have prism-like void spaces similar to those described in Examples 77-91, but instead of just one channel flow path with a variety of geometrical flow obstructions, we have two prisms in a cross pattern with common inlets and outlets. In certain embodiments, the thickness of both flow plates is the same being 0.030" thick. In some cases, the flow plates can have different thicknesses for enhanced mixing. In this design, the internal volume is roughly 50 micro liters. If one has the need to lower the internal volume, then the thickness of the flow plates could be reduced resulting in a mixing module with internal volumes approaching roughly 10 micro liters. In cases where larger internal volumes are desired, the thickness of the flow plates may be increased and/or additional parallel flow plates could be added at different rotation angles providing internal volumes for this design to easily exceed 250 micro liters. As was presented in earlier examples, static mixers can be fabricated using one or more of these mixing modules in series expanding the range of internal volumes for static mixers from 10 microliters (one module with reduced plate thickness and quantities) up to for example 1250 micro liters (four parallel flow paths, increased plate thickness, and five modules in series). All materials used for the crossed plate mixer design were either 316L stainless steel or titanium and it should be noted that any alloys suitable for HPLC applications can be used such as Hastelloy and titanium alloys, as well as polymers and ceramics may be used. It should be appreciated that the figures that correspond to Examples 103-105 are drawn for ease of illustration to depict the obstructions as void space, and to further depict open space as solid material.

Example 103

Figure 40:
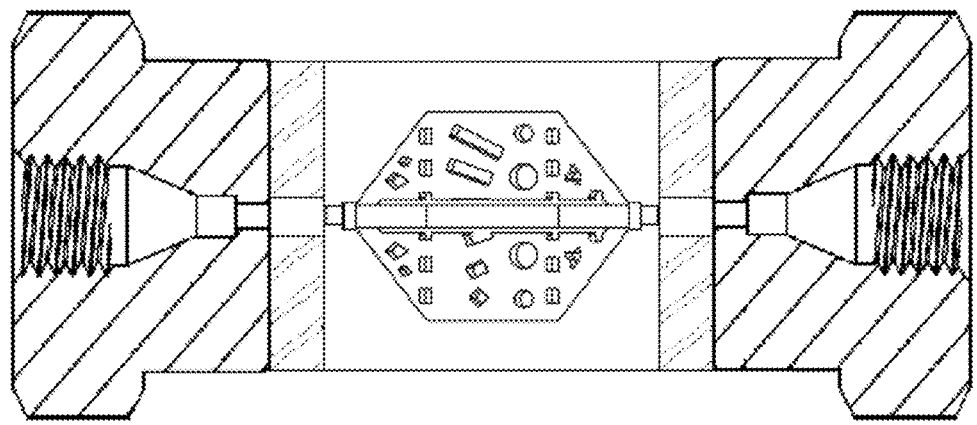
FIG. 40 illustrates an exemplary embodiment of a static mixer assembly, according to some embodiments of the present disclosure.

In this example shown in FIG. 40, we have a center mixing housing that contains one crossed pattern mixer with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ⅟₁₆" OD tubing. The internal volume of this assembly is roughly 50 micro liters.

Example 104

Figure 41:
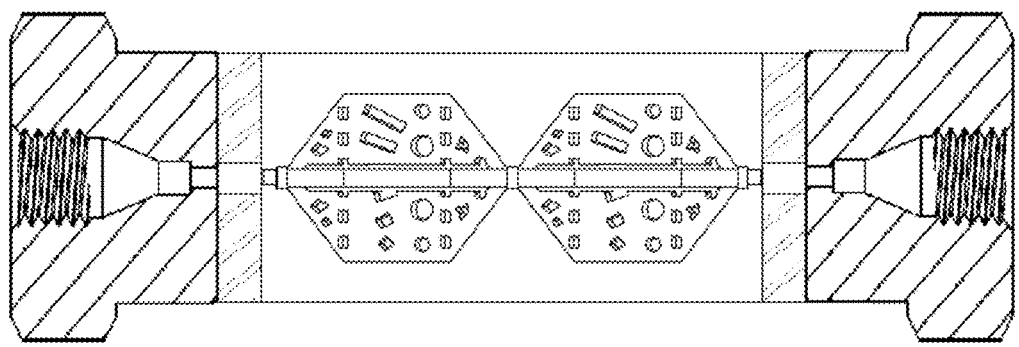
FIG. 41 illustrates an exemplary embodiment of a static mixer assembly, according to some embodiments of the present disclosure.

In this example shown in FIG. 41, we have a center mixing housing that contains two crossed pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ⅟₁₆" OD tubing. The internal volume of this assembly is roughly 100 micro liters.

Example 105

Figure 42:
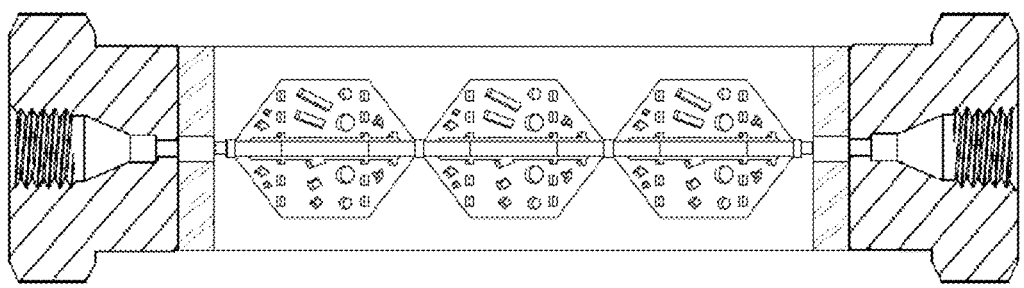
FIG. 42 illustrates an exemplary embodiment of a static mixer assembly, according to some embodiments of the present disclosure.

In this example shown in FIG. 42, we have a center mixing housing that contains three crossed pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ⅟₁₆" OD tubing. The internal volume of this assembly is roughly 150 micro liters.

Figure 43:
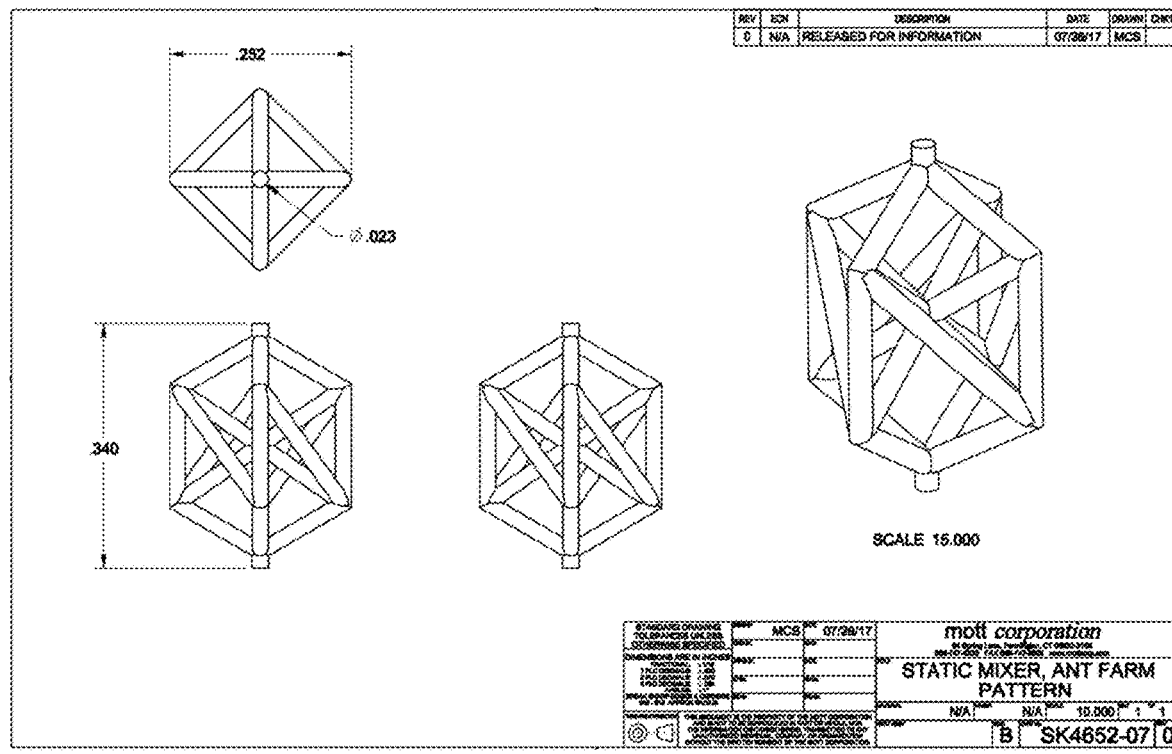
FIG. 43 illustrates an exemplary embodiment of a static mixer, according to some embodiments of the present disclosure.

A variation of the static mixers described in Examples 32-46 is generally shown in FIG. 43. In certain embodiments, we initially split into four separate flow paths each being about 0.030" diameter and then combine back to one path near the exit end of the device. The flow paths basically follow the edges, faces and center of a cube resulting in a variety of flow path lengths to providing mixing when they recombine. In certain embodiments, the internal volume was roughly 45 micro liters. To decrease the internal volume, the diameter of the flow paths can be reduced down to about 0.005" resulting in an internal volume about 5 micro liters. If one desires larger volumes, the flow path diameters may be increased to about 0.1 inches giving a volume of about 250 micro liters. In the following examples, 1-3 of these devices were placed in series into assemblies with and without porous media for testing purposes. If larger volumes are needed, one can simply add more modules in series to attain larger volumes such as 2000 micro liters if desired. All materials used for the and farm mixer design were either 316L stainless steel or titanium and it should be noted that any alloys suitable for HPLC applications can be used such as Hastelloy and titanium alloys, as well as polymers and ceramics may be used.

Example 106

Figure 44:
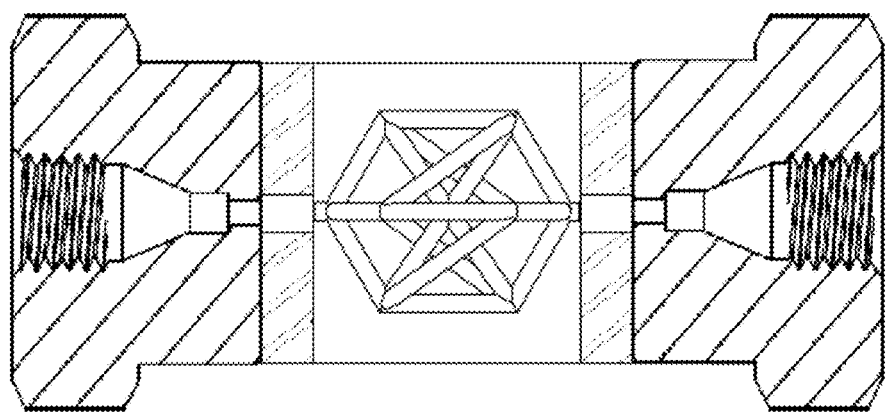
FIG. 44 illustrates an exemplary embodiment of a static mixer assembly, according to some embodiments of the present disclosure.

In this example shown in FIG. 44, we have a center mixing housing that contains one pattern mixer with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ⅟₁₆" OD tubing. The internal volume of this assembly is roughly 45 micro liters.

Example 107

Figure 45:
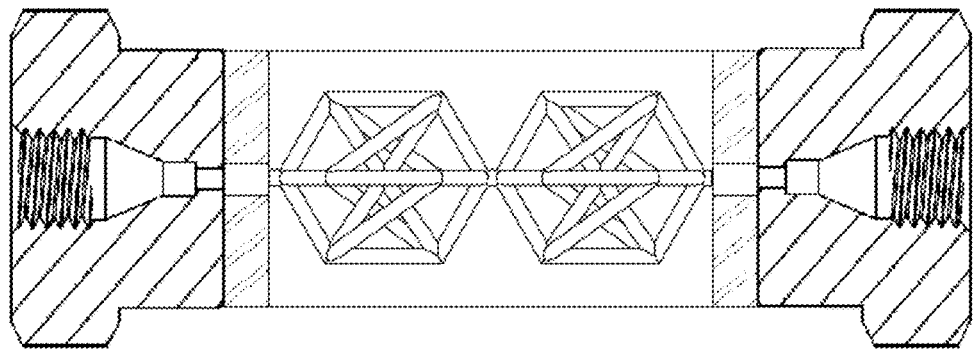
FIG. 45 illustrates an exemplary embodiment of a static mixer assembly, according to some embodiments of the present disclosure.

In this example shown in FIG. 45, we have a center mixing housing that contains two pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ⅟₁₆" OD tubing. The internal volume of this assembly is roughly 90 micro liters.

Example 108

Figure 46:
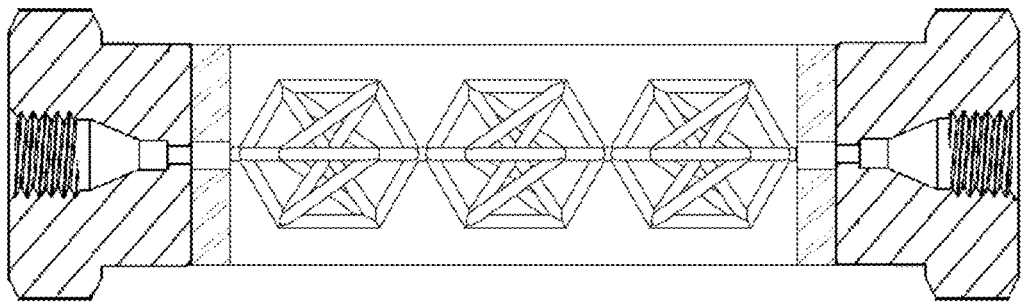
FIG. 46 illustrates an exemplary embodiment of a static mixer assembly, according to some embodiments of the present disclosure.

In this example shown in FIG. 46, we have a center mixing housing that contains three pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ⅟₁₆" OD tubing. The internal volume of this assembly is roughly 135 micro liters.

Figure 47:
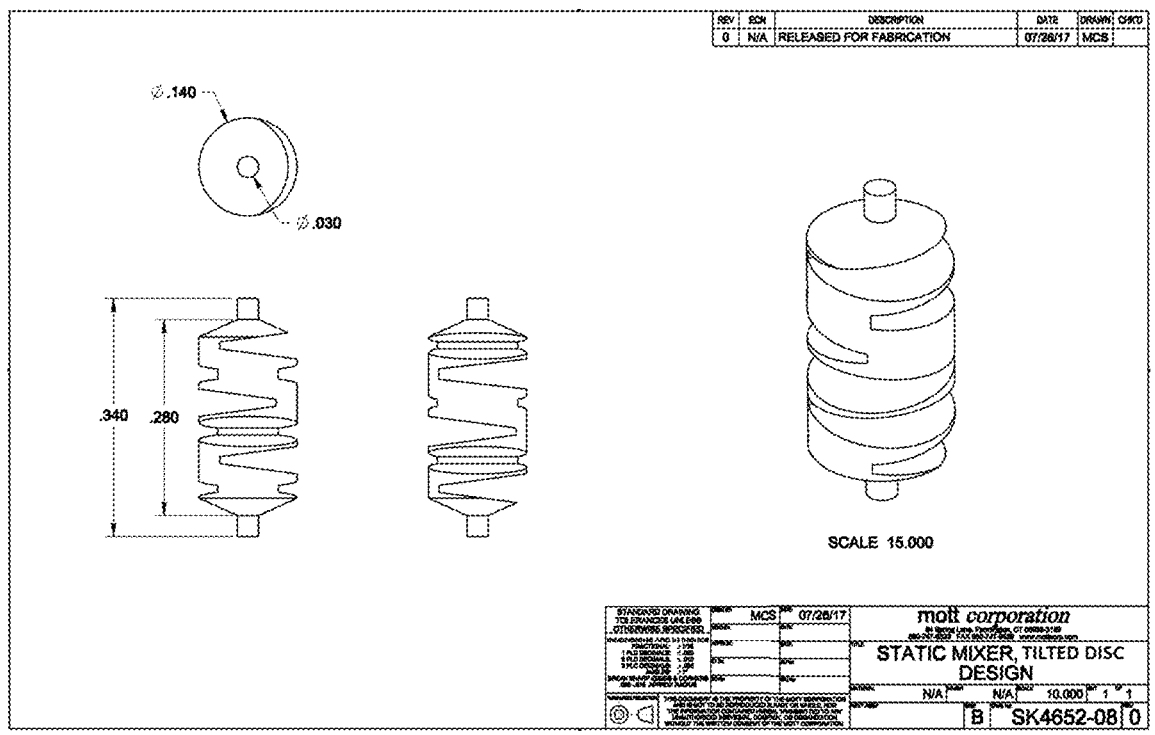
FIG. 47 illustrates an exemplary embodiment of a static mixer, according to some embodiments of the present disclosure.

Other embodiments of the static mixers of the present invention use tilted disc flow paths connected at 90 degree intervals along the length of the device, as generally shown in FIG. 47. In certain embodiments, the internal volume was roughly 40 micro liters. To decrease the internal volume, the diameter and thickness of the flow paths can be reduced down to about 0.005" thick and 0.1" diameter resulting in an internal volume about 5 micro liters. If one desires larger volumes, the flow path the thickness and diameters may be increased to achieve volumes approaching 250 micro liters. In the following examples, 1-3 of these devices were placed in series into assemblies with and without porous media for testing purposes. If larger volumes are needed, one can simply add more modules in series to attain larger volumes such as 2000 micro liters if desired. All materials used for this mixer design were either 316L stainless steel or titanium and it should be noted that any alloys suitable for HPLC applications can be used such as Hastelloy and titanium alloys, as well as polymers and ceramics may be used.

Example 109

Figure 48:
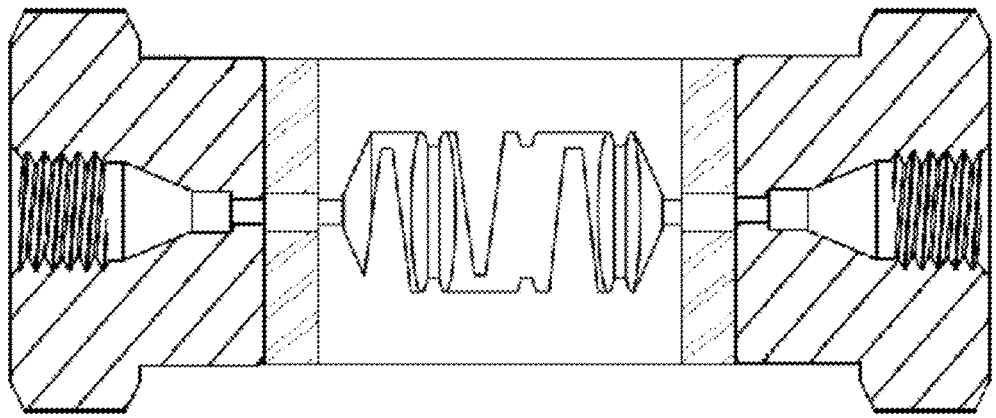
FIG. 48 illustrates an exemplary embodiment of a static mixer assembly, according to some embodiments of the present disclosure.

In this example shown in FIG. 48, we have a center mixing housing that contains one tilted disc pattern mixer with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with ⅟₁₆" OD tubing. The internal volume of this assembly is roughly 40 micro liters.

Example 110

Figure 49:
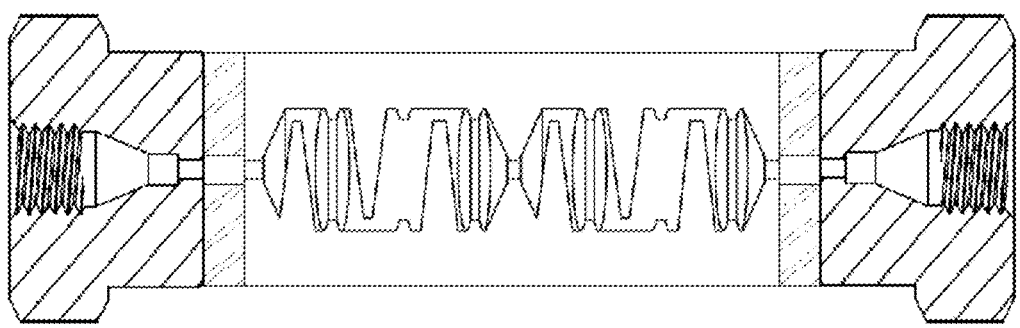
FIG. 49 illustrates an exemplary embodiment of a static mixer assembly, according to some embodiments of the present disclosure.

In this example shown in FIG. 49, we have a center mixing housing that contains two tilted disc pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 80 micro liters.

Example 111

Figure 50:
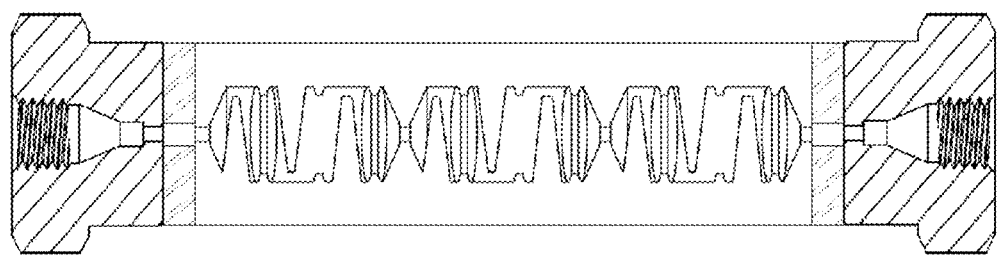
FIG. 50 illustrates an exemplary embodiment of a static mixer assembly, according to some embodiments of the present disclosure.

In this example shown in FIG. 50, we have a center mixing housing that contains three tilted disc pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 120 micro liters.

Figure 51:
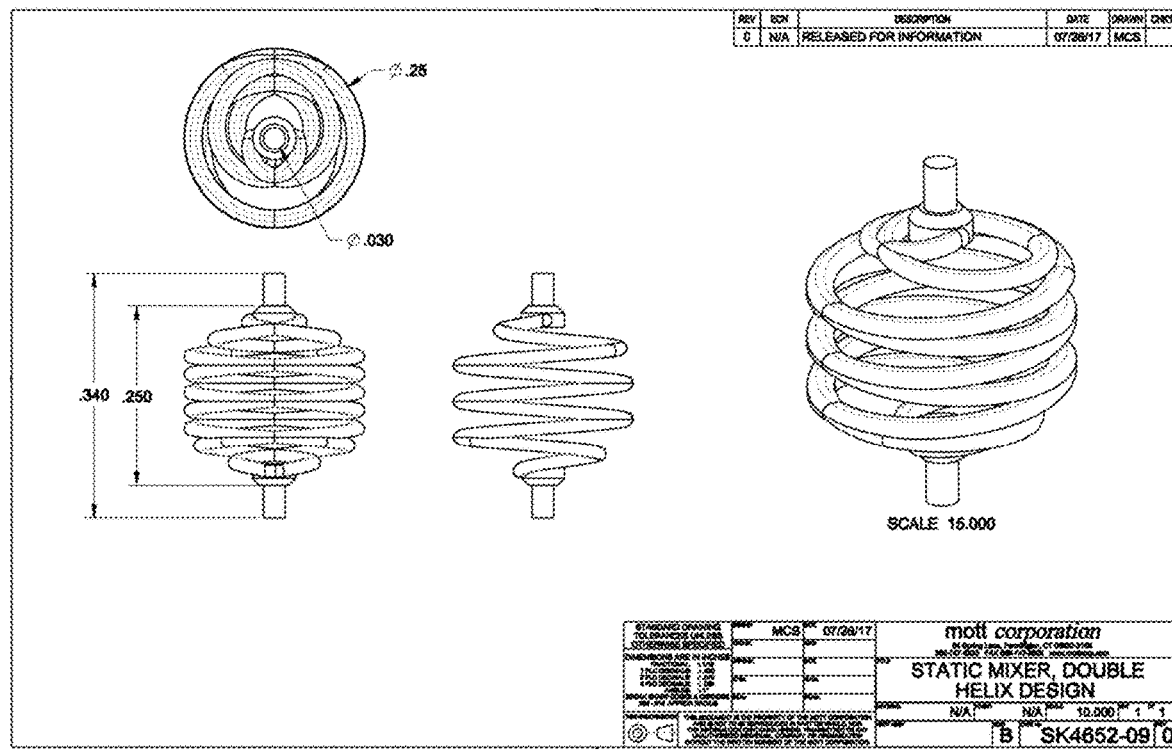
FIG. 51 illustrates an exemplary embodiment of a static mixer, according to some embodiments of the present disclosure.

A variation of the static mixers described in Examples 47-61 is generally shown in FIG. 51 and referred to as a double helix coil design for the mixing process. In certain embodiments, we have two coils, one with a clockwise rotation and the second coil with an anti-clockwise rotation. The pitch on the inner and outer coils can be the same, different, or variable along the length of the mixer. The two coils overlap by up to 100% so that fluid transfer between the inner and outer coils occur inducing mixing. Because of the clockwise and anti-clockwise rotation of the coils, when the fluid makes contact from one coil to the other, motion is nearly head on which increases the efficiency of the mixing process. In certain embodiments, both coils have flow paths of 0.030 inch diameter wound to a 0.25 inch diameter and begin and terminate on opposing sides of small volume manifolds at each end of the mixing device. In certain embodiments, the internal volume was 40 micro liters. In the following examples, 1-3 of these devices were placed in series into assemblies with and without porous media for testing purposes. The diameter of the flow paths may be decreased down to about 0.005 inches or increased to about 0.040 inches to reduce or increase the internal volume of the device. In addition, the pitch of the windings can be adjusted again to control the internal volume. The range in volume for this design can vary from 10 micro liters up to 200 micro liters for a single module. If larger volumes are needed, more modules can be added in series to attain total volumes approaching 2000 micro liters. All materials used for this mixer design were either 316L stainless steel or titanium and it should be noted that any alloys suitable for HPLC applications can be used such as Hastelloy and titanium alloys, as well as polymers and ceramics may be used.

Example 112

Figure 52:
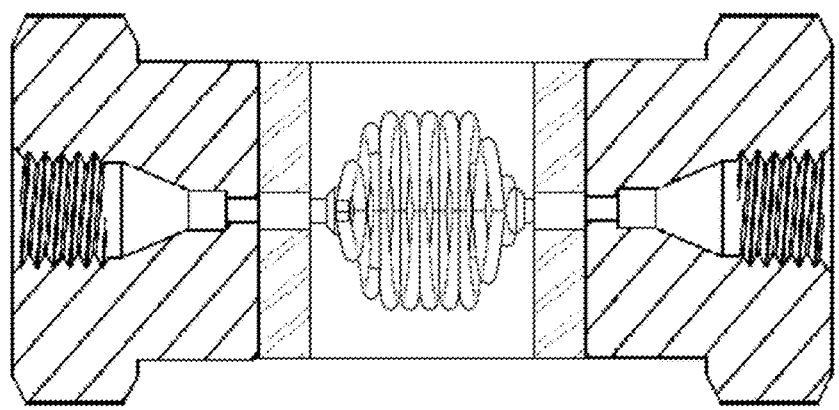
FIG. 52 illustrates an exemplary embodiment of a static mixer assembly, according to some embodiments of the present disclosure.

In this example shown in FIG. 52, we have a center mixing housing that contains one double helix pattern mixer with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 40 micro liters.

Example 113

Figure 53:
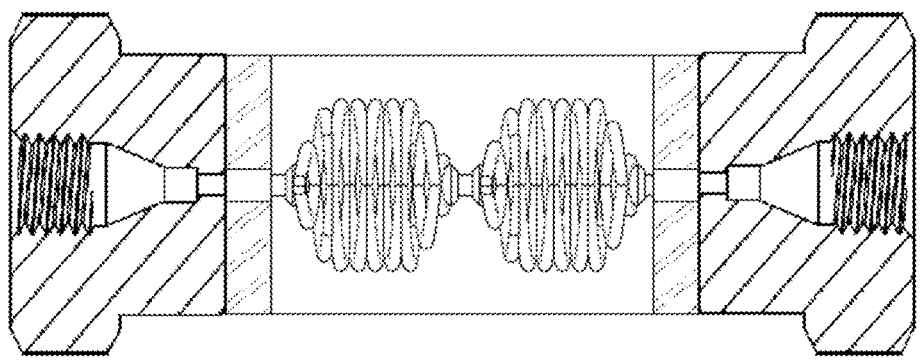
FIG. 53 illustrates an exemplary embodiment of a static mixer assembly, according to some embodiments of the present disclosure.

In this example shown in FIG. 53, we have a center mixing housing that contains two double helix pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 80 micro liters.

Example 114

Figure 54:
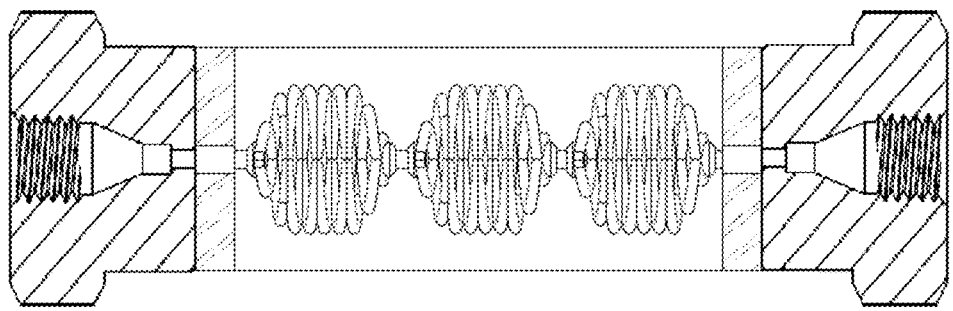
FIG. 54 illustrates an exemplary embodiment of a static mixer assembly, according to some embodiments of the present disclosure.

In this example shown in FIG. 54, we have a center mixing housing that contains three double helix pattern mixers in series with 0.062" diameter by 0.062" long chambers at both ends that were intentionally left open. Attached to the inlet and outlet sides of the mixing chamber we have HPLC interface adapters. The HPLC hardware attached to the housing for this example were standard female (internal) stainless steel Zero Dead Volume 10-32 thread compression fittings with external ¾" external hexagonal wrench surface for use with 1/16" OD tubing. The internal volume of this assembly is roughly 120 micro liters.

The performance of various Examples of the present invention listed above was measured in an HPLC environment under the following HPLC conditions:
Instrument: Agilent 1100 HPLC with Electronic Degas, Quaternary Pump, Automated Sample Injector, Column Heater, and Variable Wavelength Detector.
Instrument control and data collection using Chemstation Software.
Solvent A: 20 Millimolar solution of Ammonium Acetate in DI H2O
Solvent B: 80% Acetonitrile (ACN)/20% DI H2O
Mix Ratio: 20% A/80% B
Flow Rate: 0.5 ml/min
Mixer Location: Downstream of pump
Back Pressure: 1000 psi (60 Bar) utilizing capillary flow restrictor downstream of the mixer
Column: None
Temperature: Ambient
Detector: 220 nanometers wavelength
Injection: None Using this environment, the absorption of light was measured through solvent mixtures mixed with various static mixers, including Examples of the present invention and several commercially available mixers. The absorption is expressed in milli-absorption units or "mAU." Generally, the absorption over time is sinusoidal in nature when inadequate mixing is present, and is referred to as a ripple having an amplitude. A lower amplitude reflects a solvent mixture that is more homogeneously mixed, and would therefore result in a less noisy signal in an HPLC application. In addition to performance characteristics, the internal volume of each mixer was measured. Generally, mixers with higher internal volumes are able to more thoroughly mix solvents but degrade peak shape and resolution. As such, the most preferred mixers have low ripple amplitudes (or in other words, high reduction percentages in ripple amplitudes compared with HPLC environments that do not include a mixer), and low volumes. Corresponding performance data using previously described test methods for various Examples described above, and several commercial static mixers, are listed in Table I.

amplitude compared with no mixer) and low internal volume. For example, the static mixer of the present invention Example 72 resulted in a 98.1% reduction in ripple amplitude while having a volume of 200 microliters. A comparable commercially available mixer, listed as "Thermo 350

TABLE I

Ripple amplitude, the reduction in ripple amplitude compared with no mixer, and internal volume of static mixers of the present invention (corresponding to Example numbers listed) and commercially available static mixers, in an HPLC environment described above.

| Example # | Mixer Model | Ripple Amplitude (mAU) #1 | #2 | Average | Reduction (%) | Volume (uL) |
|---|---|---|---|---|---|---|
|  | None | 0.2151 | 0.2272 | 0.22115 | — | 0 |
|  | Waters 250 uL | 0.0061 | 0.0061 | 0.00610 | 97.2 | 250 |
|  | Agilent Jetweaver V380 | 0.0071 | 0.0068 | 0.00695 | 96.9 | 380 |
|  | Agilent Jetweaver V100 | 0.016 | 0.0142 | 0.01510 | 93.2 | 100 |
|  | Agilent Jetweaver V35 | 0.1266 | 0.1174 | 0.12200 | 44.8 | 35 |
|  | ASI-250 uL | 0.0176 | 0.0169 | 0.01725 | 92.2 | 250 |
|  | ASI-150 uL | 0.0223 | 0.0222 | 0.02225 | 89.9 | 150 |
|  | ASI-50 uL | 0.0758 | 0.0726 | 0.07420 | 66.4 | 50 |
|  | Gen3 Open 4R + 8R + 12R | 0.0033 | 0.0029 | 0.00310 | 98.6 | 420 |
| 16 | Gen3 Open 12R | 0.0301 | 0.0308 | 0.03045 | 86.2 | 210 |
| 15 | Gen3 Open 8R | 0.0625 | 0.0592 | 0.06085 | 72.5 | 140 |
| 14 | Gen3 Open 4R | 0.0922 | 0.1051 | 0.09865 | 55.4 | 70 |
|  | Gen3 Open + Porous 12R | 0.0392 | 0.0394 | 0.03930 | 82.2 | 205 |
|  | Gen3 Open + Porous 8R | 0.0586 | 0.0571 | 0.05785 | 73.8 | 135 |
|  | Gen3 Open + Porous 4R | 0.0916 | 0.0896 | 0.09060 | 59.0 | 65 |
|  | Gen3 Open + Porous 4R + 8R | 0.0288 | 0.0273 | 0.02805 | 87.3 | 200 |
| 22 | Gen3 80-10 12R | 0.1778 | 0.1766 | 0.17720 | 19.9 | 105 |
| 20 | Gen3 80-10 8R | 0.1809 | 0.1862 | 0.18355 | 17.0 | 50 |
| 18 | Gen3 80-10 4R | 0.182 | 0.1876 | 0.18480 | 16.4 | 35 |
| 9 | PT2-D | 0.1982 | 0.209 | 0.20360 | 7.9 |  |
| 13 | PT2-E | 0.1765 | 0.168 | 0.17225 | 22.1 |  |
| 1 | PT1-2222 | 0.2123 | 0.2141 | 0.21320 | 3.6 |  |
| 2 | PT1-210210 | 0.2052 | 0.2115 | 0.20835 | 5.8 |  |
| 3 | PT1-221010 | 0.2146 | 0.2178 | 0.21620 | 2.2 |  |
|  | Thermo 150 uL | 0.0178 | 0.0109 | 0.01435 | 93.5 | 150 |
|  | Thermo 350 ul | 0.0027 | 0.0021 | 0.00240 | 98.9 | 350 |
| 23 | Gen4-07 ⅛ - 8R- Open | 0.0839 | 0.0829 | 0.08340 | 49.6 |  |
| 24 | Gen4-08 ⅛ - 16R- Open | 0.0424 | 0.0449 | 0.04365 | 73.6 |  |
| 25 | Gen4-09 ⅛ - 24R- Open | 0.0237 | 0.022 | 0.02285 | 86.2 |  |
| 26 | Gen4-10 1/16 - 4R- Open | 0.1432 | 0.1545 | 0.14885 | 10.0 |  |
| 27 | Gen4-11 1/16 - 8R- Open |  | 0.1402 | 0.14020 | 15.2 |  |
| 28 | Gen4-12 1/16 - 12R- Open | 0.09889 | 0.1003 | 0.09960 | 39.8 |  |
| 29 | Gen4-13 1/16 - 8R- Open | 0.1604 | 0.1574 | 0.15890 | 3.9 |  |
| 30 | Gen4-14 1/16 - 16R- Open | 0.1297 | 0.1265 | 0.12810 | 22.6 |  |
| 31 | Gen4-15 1/16 - 24R- Open | 0.0925 | 0.082 | 0.08725 | 47.2 |  |
|  | Union | 0.1633 | 0.1675 | 0.16540 | — |  |
| 32 | Gen5 Single (Diamond) | 0.1202 | 0.1175 | 0.11885 | 46.3 | 30 |
| 37 | Gen5 Double (Diamond) | 0.082 | 0.1005 | 0.09125 | 58.7 | 90 |
| 42 | Gen5 Triple (Diamond) | 0.0398 | 0.0368 | 0.03830 | 82.7 | 130 |
| 47 | Gen6 Single (Coil) | 0.1127 | 0.1045 | 0.10860 | 50.9 | 40 |
| 52 | Gen6 Double (Coil) | 0.0758 | 0.08 | 0.07790 | 64.8 | 90 |
| 57 | Gen6 Triple (Coil) | 0.0966 | 0.072 | 0.08430 | 61.9 | 160 |
| 62 | Gen7 Single (Cylinder) | 0.0752 | 0.0795 | 0.07735 | 65.0 | 40 |
| 67 | Gen7 Double (Cylinder) | 0.0179 | 0.0167 | 0.01730 | 92.2 | 80 |
| 72 | Gen7 Triple (Cylinder) | 0.0046 | 0.0039 | 0.00425 | 98.1 | 130 |
| 77 | Gen8 Single (Prism) | 0.1385 | 0.1409 | 0.13970 | 36.8 | 35 |
| 82 | Gen8 Double (Prism) | 0.0863 | 0.0921 | 0.08920 | 59.7 | 65 |
| 87 | Gen8 Triple (Prism) | 0.0833 | 0.076 | 0.07965 | 64.0 | 190 |
| 92 | Gen9 Single (Parallel Plates) | — | — | — | 39.7 | 40 |
| 93 | Gen9 Double (Parallel Plates) | — | — | — | 63.9 | 66 |
| 94 | Gen9 Triple (Parallel Plates) | — | — | — | 79.3 | 104 |
| 95 | Gen9 Quad (Parallel Plates) | — | — | — | 87.6 | 144 |
| 96 | Gen9 Quintuplet (Parallel Plates) | — | — | — | 91.4 | 169 |
| 99 | Gen10 Triple (Diamond) | — | — | — | 70.7 | 129 |
| 102 | Gen11 Triple (Expanded Diamond) | — | — | — | 87.3 | 140 |
| 105 | Gen12 Triple (Crossed Prism) | — | — | — | 74.4 | 146 |
| 108 | Gen13 Triple (Ant Farm) | — | — | — | 79.2 | 132 |
| 111 | Gen14 Triple (Tilted Disc) | — | — | — | 74.0 | 126 |
| 114 | Gen15 Triple (Double Helix) | — | — | — | 67.6 | 114 |

Figure 22:
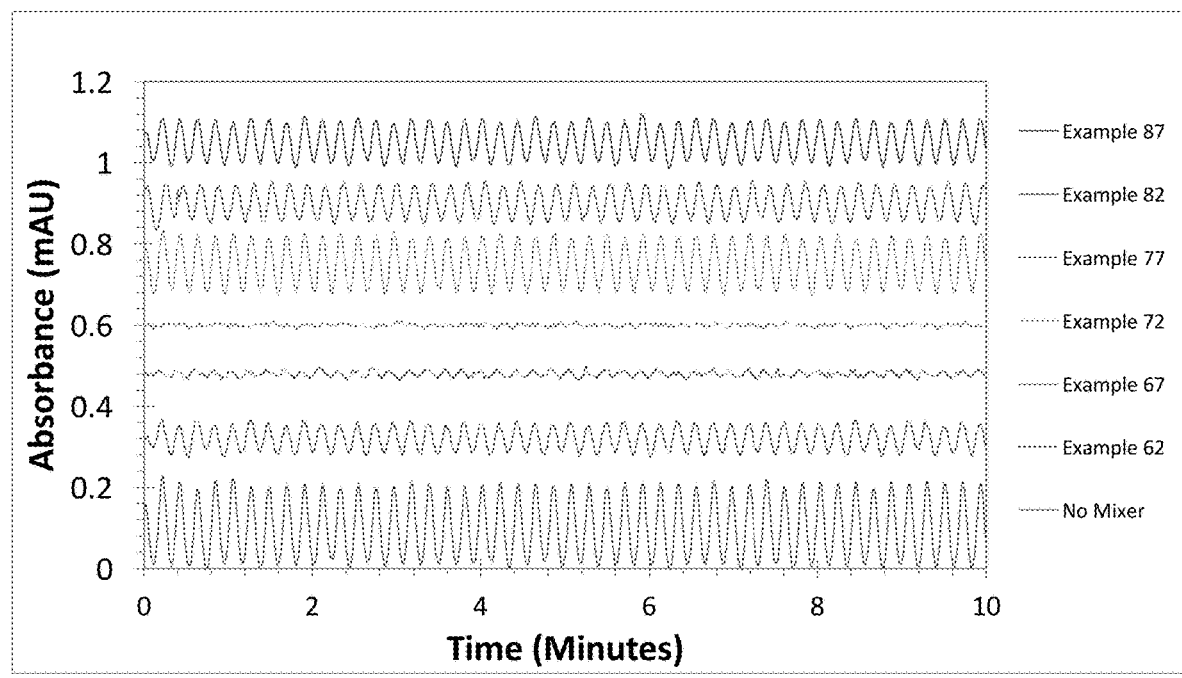
FIG. 22 illustrates an exemplary graph of absorbance versus time, according to some embodiments of the present disclosure.

The data listed in Table I demonstrate that the static mixers of the present invention offer desired combinations of low ripple amplitude (or high percent reduction in ripple ul" in Table I, provides a similar reduction in ripple amplitude (98.9%), but has a much higher volume of 350 microliters. Measurements of HPLC detector signal over time through solvents mixed with exemplary static mixers of the present invention are shown in FIG. 22, which graphically illustrate the ripple amplitude data listed in Table I.

Figure 23:
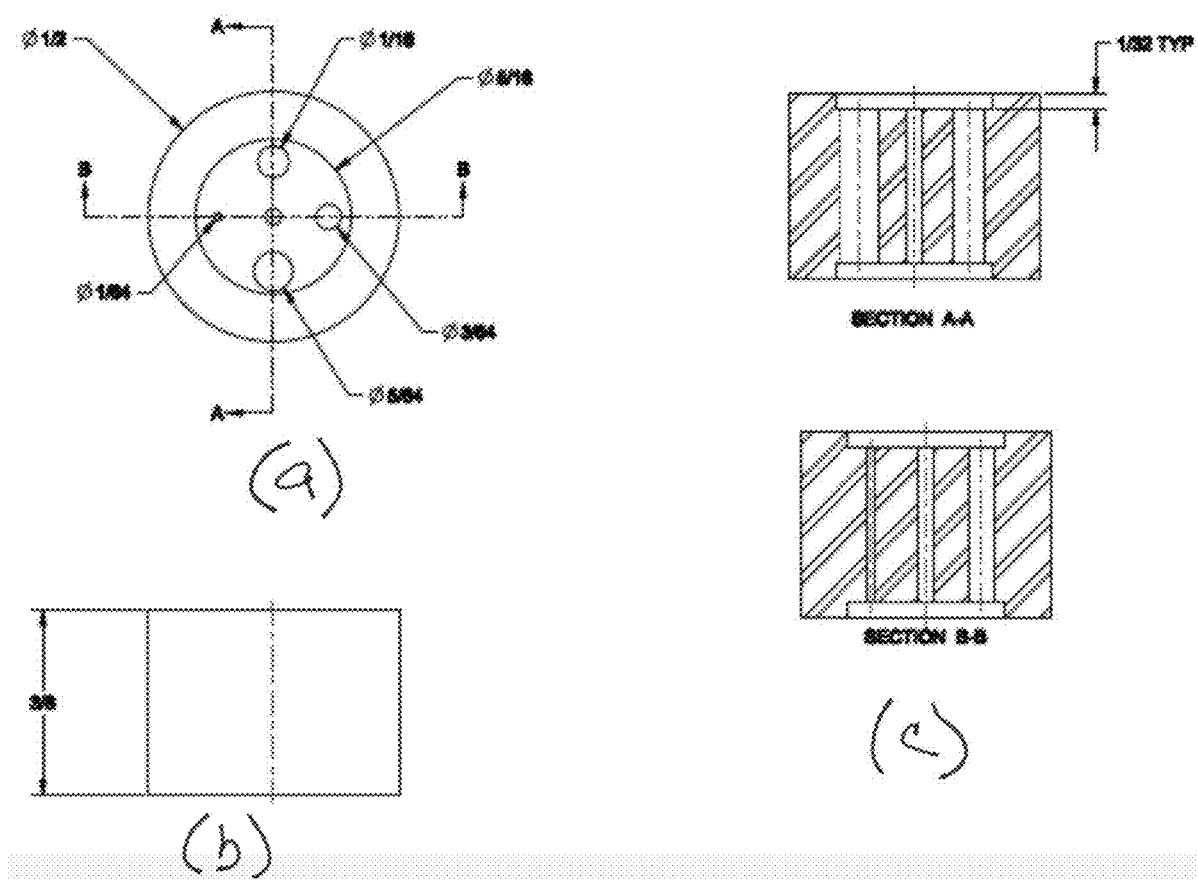
FIG. 23 illustrates an exemplary embodiment of a mixer housing, according to some embodiments of the present disclosure.
Figure 24:
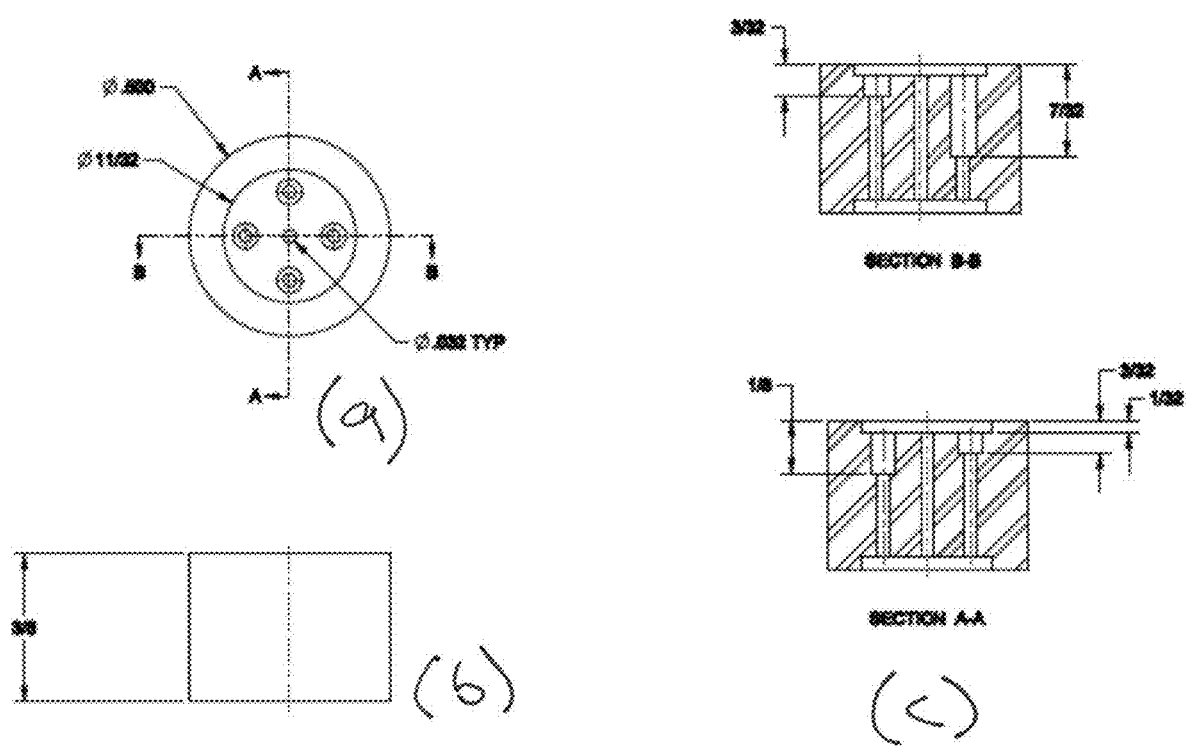
FIG. 24 illustrates an exemplary embodiment of a mixer housing, according to some embodiments of the present disclosure.

In other embodiments, the present invention comprises a housing with multiple openings having different diameters from each other, with each opening extending through the housing either with a constant diameter or with one or more of the openings having a varying diameter. The different diameter opening result in different fluid flow rates through the openings, thus resulting in the mixing fluids after movement through the mixer. In one such embodiment as shown in FIG. 23 (with FIGS. 23a, b and c showing top, side and cross-sectional views of a mixer housing), there are five parallel openings through a single housing, with each passage having a different diameter. In an exemplary embodiment, the diameters of the openings range from 0.015" to 0.078", although it should be appreciated that any suitable diameters would be applicable to the present invention. The difference in the diameters results in a difference in the internal volume of each flow passage such that when fluids recombine after moving through the mixer, phase mixing occurs. In an alternate embodiment as shown in FIG. 24 (with FIGS. 24a, b and c showing top, side and cross-sectional views of a mixer housing), there are also five through openings, but here, four of the openings have varying diameters as can be seen in FIG. 24c. In this particular embodiment, the central passage has a constant diameter of about 0.03" whereas the other passages start with a larger diameter of about 0.06" and transition to smaller diameters at different points along their lengths. It should be appreciated that other suitable diameters are also useful in the present invention. The transition to smaller diameters can be gradual or step-wise, as shown in FIG. 24c. In either embodiment of FIG. 23 or FIG. 24, the openings may be left fully open or filled with porous media at one or both ends, or throughout, to reduce the total internal volume and to aid in micro mixing. Although the current embodiments are described and illustrated as having five openings, it should be noted that the number of openings can be fewer or more to impact mixing characteristics. Moreover, these embodiments may be used in conjunction with HPLC hardware as described herein for other the embodiments and Examples.

Although all of the Examples described above were manufactured using stainless steel materials, it should be appreciated that other metallic materials such as titanium and nickel based alloys, as well as suitable polymers, ceramics and composites may also be used. Moreover, although all of the embodiments and Examples described herein have one input and one output fluid path, it should be appreciated that in some cases, fluids to be mixed by the mixers of the present invention come from two different flow sources, which may require mixer assemblies that include two or more standard HPLC connections on the inlet side of the mixer assembly to combine the fluids prior to entering the mixing portion of the device.

The various static mixer embodiments described herein can be used as stand-alone, singular devices, or as multiple units plumbed in series to provide additional levels of mixing. In the latter case, mixer assemblies can be fabricated with male and female HPLC compression fittings to make it more convenient to connect multiple mixers together while at the same time minimizing their linear footprint where space is a concern.

Certain embodiments of the present invention are described above. It is, however, expressly noted that the present invention is not limited to those embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the present invention. As such, the invention is not to be defined only by the preceding illustrative description and examples.

We claim:

1. A device comprising:
   a housing having a proximal end, a distal end, and an opening extending between the proximal and distal ends; and
   a plurality of metal frits positioned within said opening of said housing, each of said metal frits extending across a cross-sectional dimension of said opening and having interconnected porosity;
   wherein the plurality of metal frits comprises:
      a plurality of plates, each plate extending from an inlet end to an outlet end and defining a flow path direction travelling from the inlet end to the outlet end, with a plurality of varied polygonal void shapes extending through each plate perpendicular to the flow path direction to impede flow and create mixing; and
      an inlet manifold in communication with each inlet end of each plate of the plurality of plates, and an outlet manifold in communication with each outlet end of each plate of the plurality of plates;
      wherein the flow path directions of each plate of the plurality of plates are parallel to one another.

2. The device of claim 1, wherein said opening comprises a circular cross-section.

3. The device of claim 2, wherein the cross-section of said opening is characterized by a substantially constant dimension along a full length of said opening.

4. The device of claim 3, wherein said substantially constant dimension is up to about 0.06 inches.

5. The device of claim 3, wherein said opening is characterized by a length of up to about 0.025 inches.

6. The device of claim 2, wherein the cross-section of said opening is characterized by at least two different dimensions along a full length of said opening.

7. The device of claim 6, wherein a first dimension of at least two different dimensions is up to about 0.06 inches, and a second dimension of at least two different dimensions is up to about 0.03 inches.

8. The device of claim 6, wherein the cross-section of said opening is characterized by a first dimension at each of said proximal and distal ends, and a second dimension at a location between said proximal and distal ends, wherein said second dimension is less than said first dimension.

9. The device of claim 8, wherein said first dimension is up to about 0.06 inches and said second dimension is up to about 0.03 inches.

10. The device of claim 1, wherein said plurality of metal frits comprises at least three metal frits.

11. The device of claim 1, wherein said plurality of metal frits comprises at least four metal frits.

12. The device of claim 1, wherein at least one of said plurality of metal frits is characterized by a nominal pore size of about 2 micrometers.

13. The device of claim 12, wherein at least one of said plurality of metal frits is characterized by a nominal pore size of about 10 micrometers.

14. The device of claim 1, wherein each of said plurality of metal frits is characterized by a nominal pore size of about 2 micrometers.

15. The device of claim 1, wherein each of said plurality of metal frits is characterized by a nominal pore size of about 10 micrometers.

16. The device of claim 1, wherein each of said plurality of metal frits is in physical contact with an adjacent metal frit.

17. The device of claim 1, wherein at least one of said plurality of metal frits is separated by a gap from an adjacent metal frit.

18. The device of claim 17, wherein said gap has a length of up to about 0.03 inches.

19. The device of claim 17, wherein said gap has a length of greater than about 0.03 inches.

20. The device of claim 17, wherein loose particulate is placed within said gap.

21. The device of claim 20, wherein said loose particulate comprises metal particles having an average dimension of up to approximately 100 micrometers.

22. A device comprising:
a housing having a proximal end, a distal end, an opening extending between the proximal and distal ends, and a longitudinal axis extending through the proximal and distal ends; and
a metal frit positioned within the opening of the housing extending across a cross-sectional dimension of the opening and having interconnected porosity, the metal frit having
a first flow plate and a second flow plate extending from an inlet end to an outlet end, the first flow plate defining a first flow path direction travelling from the inlet end to the outlet end and the second flow plate defining a second flow path direction travelling from the inlet end to the outlet end, with a first plurality of varied polygonal void shapes extending through the first flow plate perpendicular to the first flow path direction to impede flow and create mixing and a second plurality of varied polygonal void shapes extending through the second flow plate perpendicular to the second flow path direction to impede flow and create mixing; and
wherein the first flow plate is orthogonally oriented relative to the second flow plate.

23. A device comprising:
a housing having a proximal end, a distal end, an opening extending between the proximal and distal ends, and a longitudinal axis extending through the proximal and distal ends; and
a metal frit positional within the opening of the housing extending across a cross-sectional dimension of the opening and having interconnected porosity, the metal frit having:
a proximal opening at the proximal end of the housing;
a distal opening at the distal end of the housing;
a first helix extending around the longitudinal axis in a first rotational flow path direction, the first helix extending from the proximal opening to the distal opening; and
a second helix extending from the proximal opening to the distal opening, the second helix extending around the longitudinal axis in a second rotational flow path direction substantially opposite of the first rotational flow path direction of the first helix, the second helix in fluid communication with the first helix.

* * * * *